US009977235B2

(12) United States Patent
Ramer et al.

(10) Patent No.: US 9,977,235 B2
(45) Date of Patent: May 22, 2018

(54) VARIABLE TOTAL INTERNAL REFLECTION ELECTROWETTING LENS ASSEMBLY FOR A DETECTOR

(71) Applicant: ABL IP HOLDING LLC, Conyers, GA (US)

(72) Inventors: David P. Ramer, Reston, VA (US); An Mao, Reston, VA (US); Jack C. Rains, Jr., Herndon, VA (US)

(73) Assignee: ABL IP HOLDING LLC, Conyers, CA (US)

( * ) Notice: Subject to any disclaimer, the term of this patent is extended or adjusted under 35 U.S.C. 154(b) by 155 days.

(21) Appl. No.: 15/188,232

(22) Filed: Jun. 21, 2016

(65) Prior Publication Data
US 2017/0363859 A1    Dec. 21, 2017

(51) Int. Cl.
| G02B 26/00 | (2006.01) |
| G02B 17/00 | (2006.01) |
| G01J 1/04 | (2006.01) |
| G01J 1/02 | (2006.01) |

(52) U.S. Cl.
CPC .......... *G02B 26/005* (2013.01); *G01J 1/0266* (2013.01); *G01J 1/0411* (2013.01); *G01J 1/0437* (2013.01); *G02B 17/006* (2013.01)

(58) Field of Classification Search
CPC .... G02B 26/005; G02B 17/006; G02C 7/085; G01J 1/0266; G01J 1/0411; G01J 1/0437
USPC .................. 250/216, 239; 359/228, 665, 666
See application file for complete search history.

(56) References Cited

U.S. PATENT DOCUMENTS

| 5,485,317 | A | 1/1996 | Perissinotto et al. |
| 5,757,557 | A | 5/1998 | Medvedev et al. |
| 6,095,668 | A | 8/2000 | Rykowski et al. |
| 7,230,771 | B2 | 6/2007 | Kuiper et al. |
| 7,382,544 | B2 | 6/2008 | Cernasov |
| 7,616,881 | B2 | 11/2009 | Liang et al. |
| 7,658,528 | B2 | 2/2010 | Hoelen |
| 8,231,249 | B2 | 7/2012 | Tsuboi et al. |
| 8,373,931 | B2 | 2/2013 | Yamazaki et al. |
| 8,508,436 | B2 | 8/2013 | Jessop |
| 8,564,884 | B2 | 10/2013 | Hirsa et al. |

(Continued)

OTHER PUBLICATIONS

Non Final Office Action for U.S. Appl. No. 15/188,195, dated Dec. 14, 2017, 13 pages.

*Primary Examiner* — Que T Le
(74) *Attorney, Agent, or Firm* — RatnerPrestia

(57) ABSTRACT

Disclosed are examples of optical/electrical devices including a variable TIR lens assembly having a transducer, an optical lens and an electrowetting cell coupled to an exterior wall of the lens. The electrowetting cell contains two immiscible liquids having different optical and electrical properties. One liquid has a high index of refraction, and the other liquid has a low index of refraction. At least one liquid is electrically conductive. A signal causes the high index of refraction and the low index of refraction liquids to assume various positions within the electrowetting cell along the exterior wall. The properties of the optical lens, e.g. its total internal reflectivity, change depending upon the position of the respective liquids along the exterior wall. The light detection characteristics of the assembly change to receive an input light beam over a range of inputs or over a range of fields of view.

20 Claims, 17 Drawing Sheets

(56) References Cited

U.S. PATENT DOCUMENTS

| | | | |
|---|---|---|---|
| 8,649,102 B2* | 2/2014 | Berge | G02B 3/14 |
| | | | 359/665 |
| 9,488,758 B2 | 11/2016 | Hirsa | |
| 2008/0186709 A1 | 8/2008 | Kuiper | |

* cited by examiner

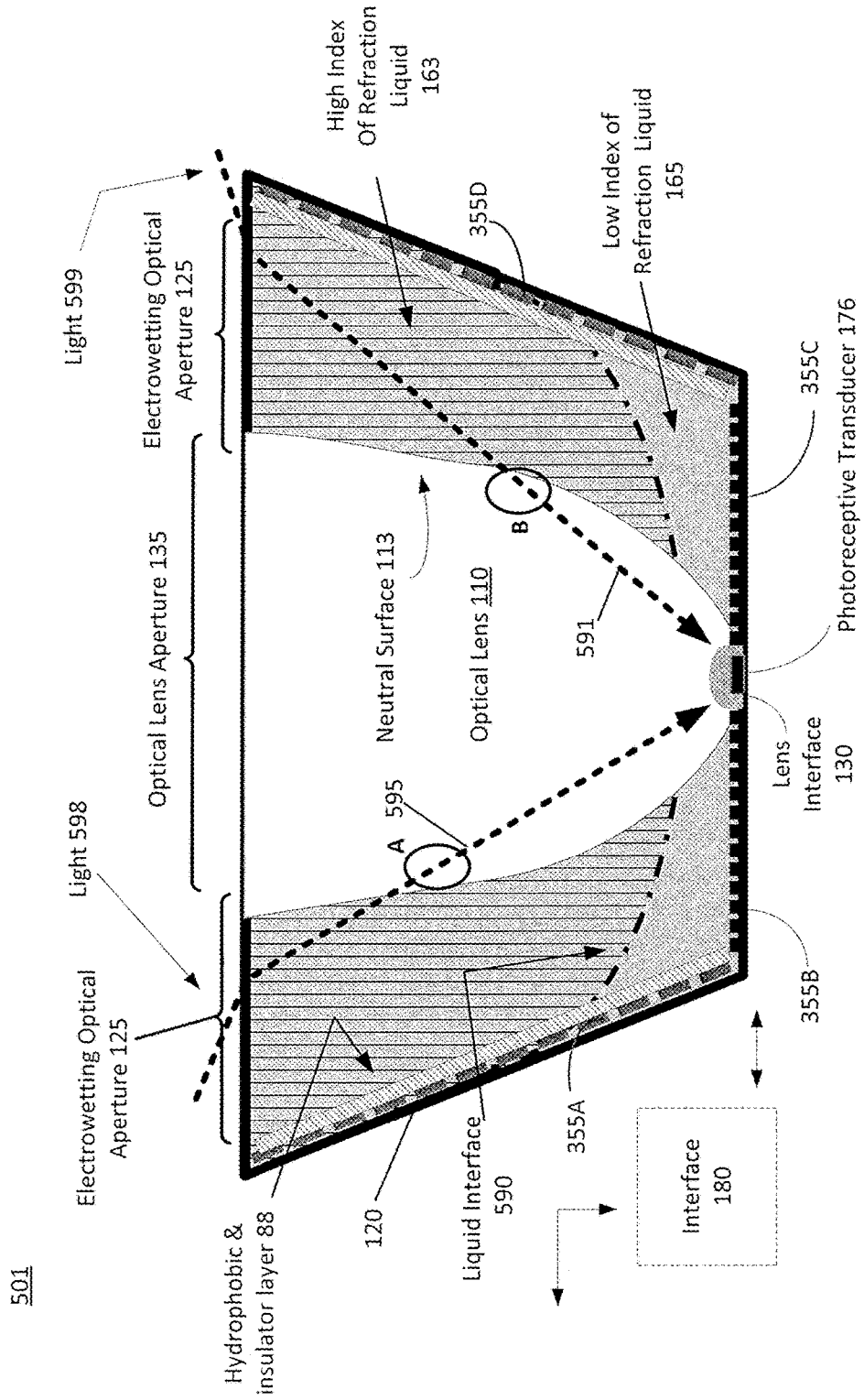

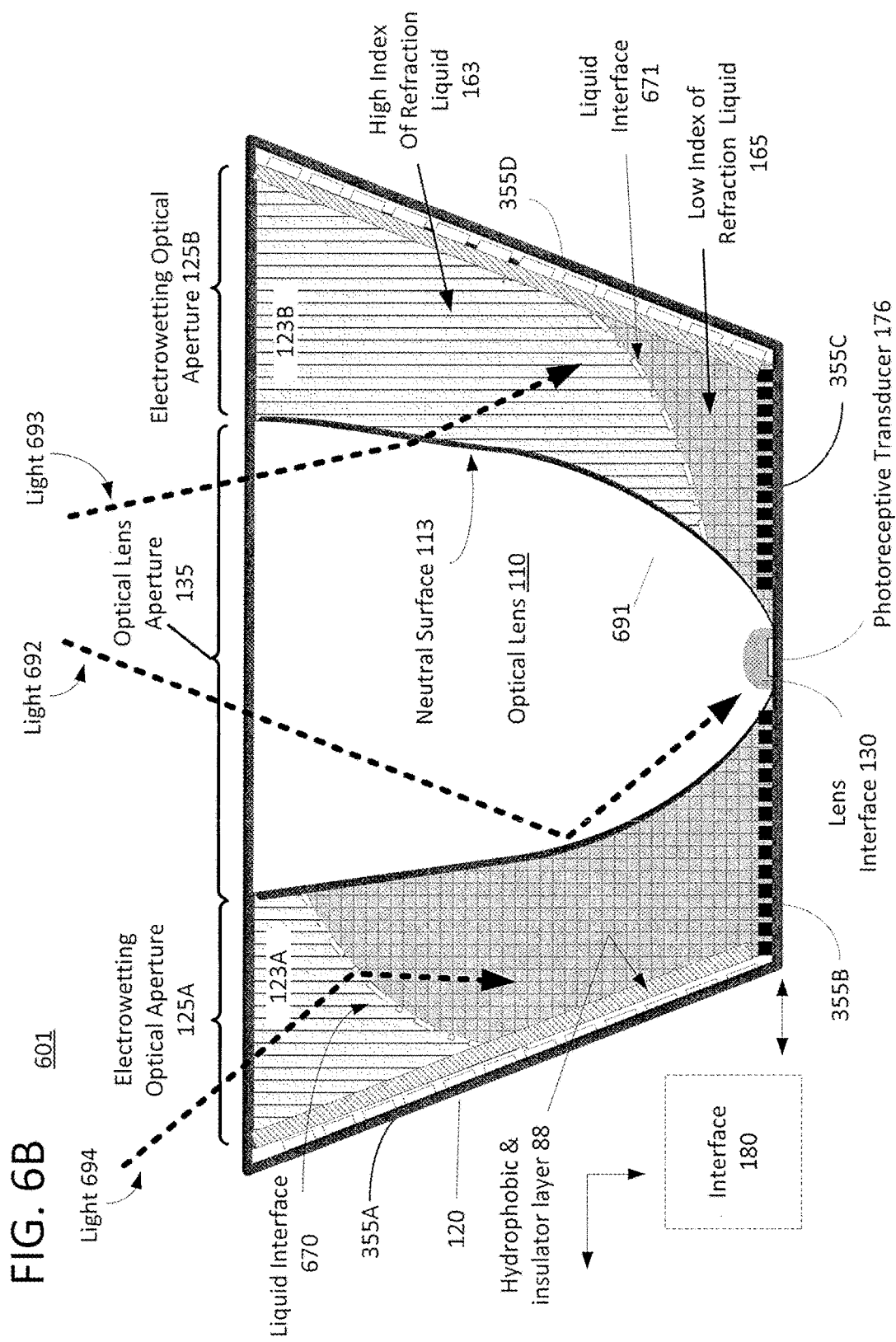

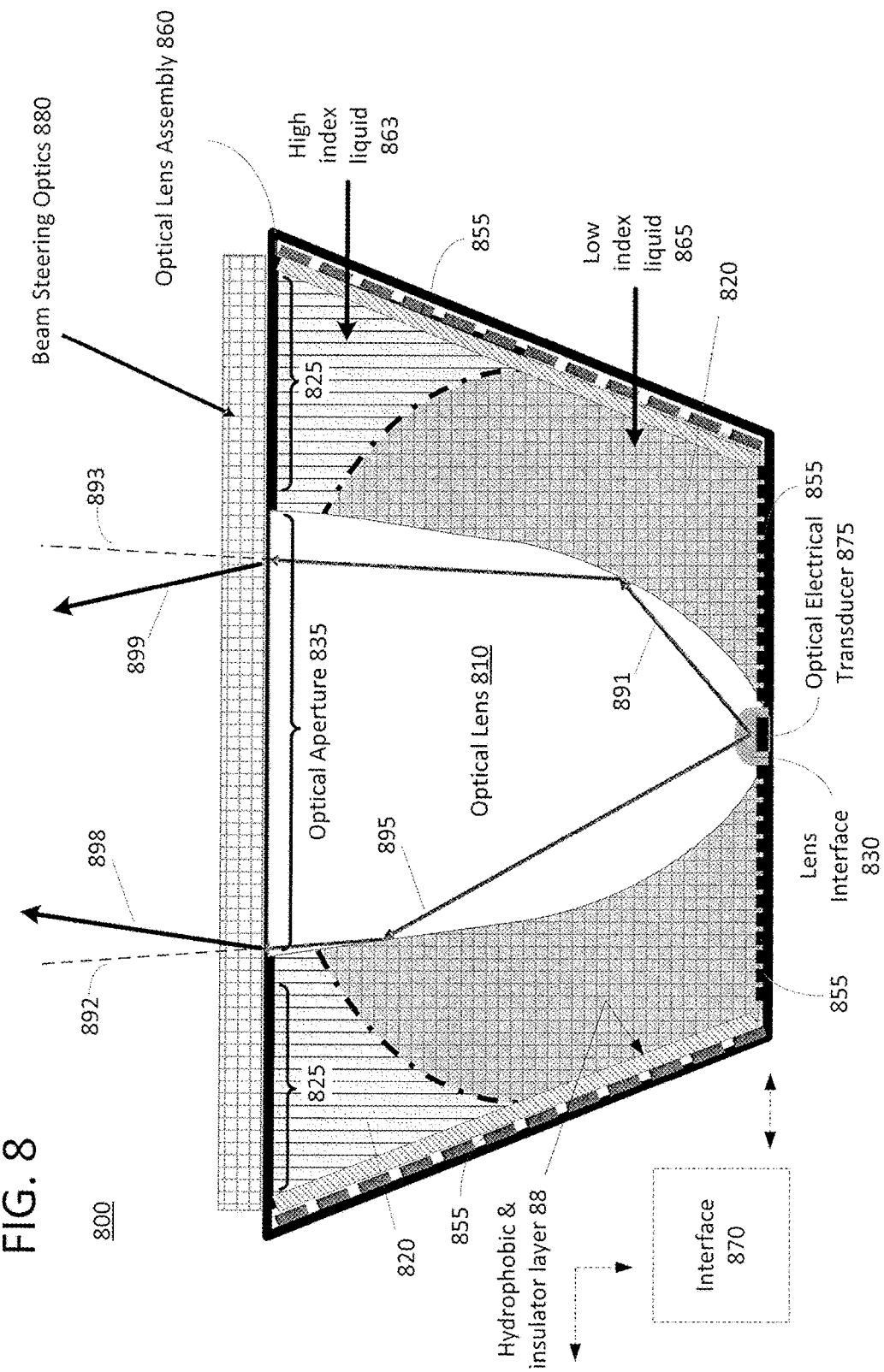

VARIABLE TOTAL INTERNAL REFLECTION ELECTROWETTING LENS ASSEMBLY FOR A DETECTOR

BACKGROUND

Devices have been available for some time that either detect light or output light. Some devices do both. In order to provide an indication of detected light or to output the light, a transducer may be used that either responds to the detection of light by outputting an electrical signal, or in response to an applied voltage or current emits light. The transducers that detect light or output light commonly require additional external optics to either vary the field of view or focus the output light.

In recent years, lighting devices that take advantage of total internal reflection (TIR) lenses have been used to provide light having predetermined characteristics, such as predetermined beam shape and beam direction. For example, a TIR lens may collimate light from a source within the lighting device. Alternatively, TIR lenses having preset fields of view that are used for various light detection purposes, such as detecting light directly in front of the detector so to obtain a better indication of the presence of light in the vicinity of the detector.

The TIR lens, however, has a fixed optic. Typically, a lighting device using a TIR lens has to use external variable optics to selectively block and redirect the light output from the TIR lens, if a user desired any variation of the beam shape or the beam direction of the output light. Similarly, a detection device using a TIR lens also has to use external variable optics to selectively direct light toward the light detecting transducer.

A variety of variable optics are known among these, electro-fluidic or electrowetting type optics are increasing in popularity for a variety of applications. An electrowetting lens enables variation in the beam shape and/or beam direction of light passing through the electrowetting lens. However, the integration of the electrowetting lens with a lighting device lens has limitations with respect to the extent that beam shaping and beam steering that can be performed on the light output from a lens or the like of the lighting device lens.

Hence a need exists for improvement in extending the degree of beam shaping and beam steering that can be provided with a TIR lens equipped lighting device.

SUMMARY

Disclosed is an example of a detection device including a photoreceptive transducer, a signal interface, a lens of a transparent material, and a controllable electrowetting assembly. The photoreceptive transducer may be configured to detect light and generate signals in response to the detected light. The signal interface may be coupled to the transducer to receive the generated signals from the transducer, and is configured to output detection signals based on the received generated signals. The lens may be a transparent material having a first index of refraction. The lens includes an optical lens aperture, a lens interface and a transparent exterior lens wall. The optical lens aperture may be opposite the lens interface, and may be configured to receive light from field of view for direction through the transparent lens toward the transducer. The lens interface provides light to the transducer. The transparent exterior lens wall extending from the lens interface to the optical lens aperture. The controllable electrowetting assembly may surround the transparent lens. The controllable electrowetting assembly may be coupled to the signal interface and is configured to respond to electrowetting signals received from the signal interface. The controllable electrowetting assembly includes sealed container walls, a high index of refraction liquid a low index of refraction liquid, and electrodes. The sealed container walls include at least one wall spaced about the transparent lens, and form a fluidic sealed cell with the exterior wall of the transparent lens. The high index of refraction liquid and the low index of refraction liquid are contained in the sealed cell. One of the liquids is conductive and the other of the liquids is an insulator. The electrowetting optical aperture is through one or more of the container walls and extends outward from the optical lens aperture. The electrodes are coupled to the signal interface and are electrically coupled with at least the low index of refraction liquid. The low index of refraction liquid may be responsive to the electrowetting signals output from the signal interface, to vary an amount of the exterior wall of the transparent lens covered by the low index of refraction liquid. By varying an amount of the mount of the exterior wall of the transparent lens covered by the low index of refraction liquid, the total internal reflection of light within the transparent lens is caused to thereby vary a direction and/or shape of light received from the field of view via the electrowetting optical aperture and/or the optical lens aperture.

Another example provides a device that includes a transducer and a variable lens assembly. The transducer converts optical energy into an electrical signal. The variable lens assembly may be coupled to deliver light to the transducer. The variable lens assembly includes a structurally static lens formed of a transparent material having a first index of refraction in a fixed shape and a controllable electrowetting cell. The structurally static lens includes a lens interface, an optical aperture and an exterior wall. The lens interface may be at a proximal end of the shape to provide light to the transducer. The optical aperture may be at a distal end of the shape opposite the proximal end to receive light from an environment in which the device is located. The exterior wall extends from a portion of the lens interface to a portion of the optical aperture. The controllable electrowetting cell may be coupled to the exterior wall of the transparent lens. The controllable electrowetting cell may be coupled to the exterior wall of the transparent lens. The controllable electrowetting cell includes a container wall, an electrode, a high index of refraction liquid and an electrically conductive low index of refraction liquid. The container wall may be spaced from the exterior wall of the transparent lens. The container wall and the exterior wall of the transparent lens form a fluidic leakproof container. The electrode associated with the container wall to receive a control signal. The high index of refraction liquid and the electrically conductive low index of refraction liquid are within the container, and are immiscible. The high index of refraction liquid and the low index of refraction liquid, in response to a change of the control signal, change positions within the electrowetting cell thereby altering internal light reflection characteristics of the exterior wall of the transparent lens.

Disclosed in yet another example is a variable optical detection device that includes a light detector, a variable lens assembly and electrodes. The light detector converts detected light into an electrical signal. The variable lens assembly directs input light toward the light detector, and includes a static, transparent total internal reflection lens and a variable electrowetting cell. The lens has a first field of view. The variable electrowetting cell includes a container, a high index of refraction liquid and a low index of refraction liquid. The container forms a fluidically sealed space about the transparent lens. The high index of refraction liquid and the low index of refraction liquid are contained in the sealed space of the cell, and one of the liquids is conductive and the other of the liquids is an insulator. The electrodes are coupled to the variable lens assembly and at least electrically coupled with at least the low index of refraction liquid. The variable electrowetting cell is configured to change a first field of view of the lens assembly device to a second field of view, in response to an electrowetting signal applied via the electrodes.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5B is a cross-sectional view of an example of a light detection device having a variable TIR lens configured to receive light in a wide field of view.

FIG. 6B is a cross-sectional view of an example of a light detecting device having a variable TIR lens configured to receive an input beam of light from a specific direction in relation to the variable TIR lens.

FIG. 8 is a cross-sectional view of an example of a variable TIR lens assembly with a controllable external beam steering device.

DETAILED DESCRIPTION OF EXAMPLES

Figure 1:
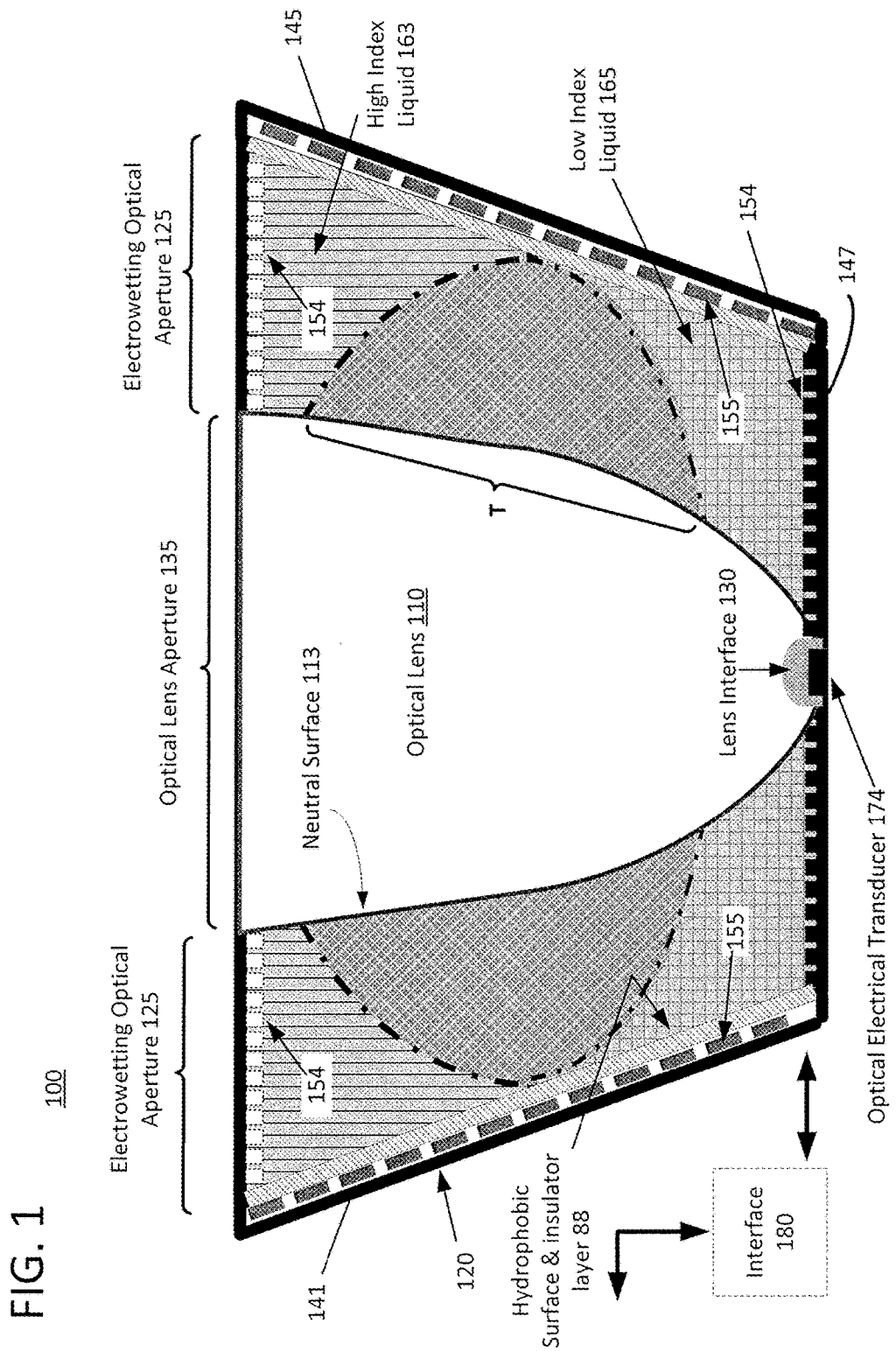
FIG. 1 illustrates a cross-sectional view of a general example of a lighting device incorporating an example of variable optical lens assembly utilizing an electrowetting cell to vary TIR.
Figure 2:
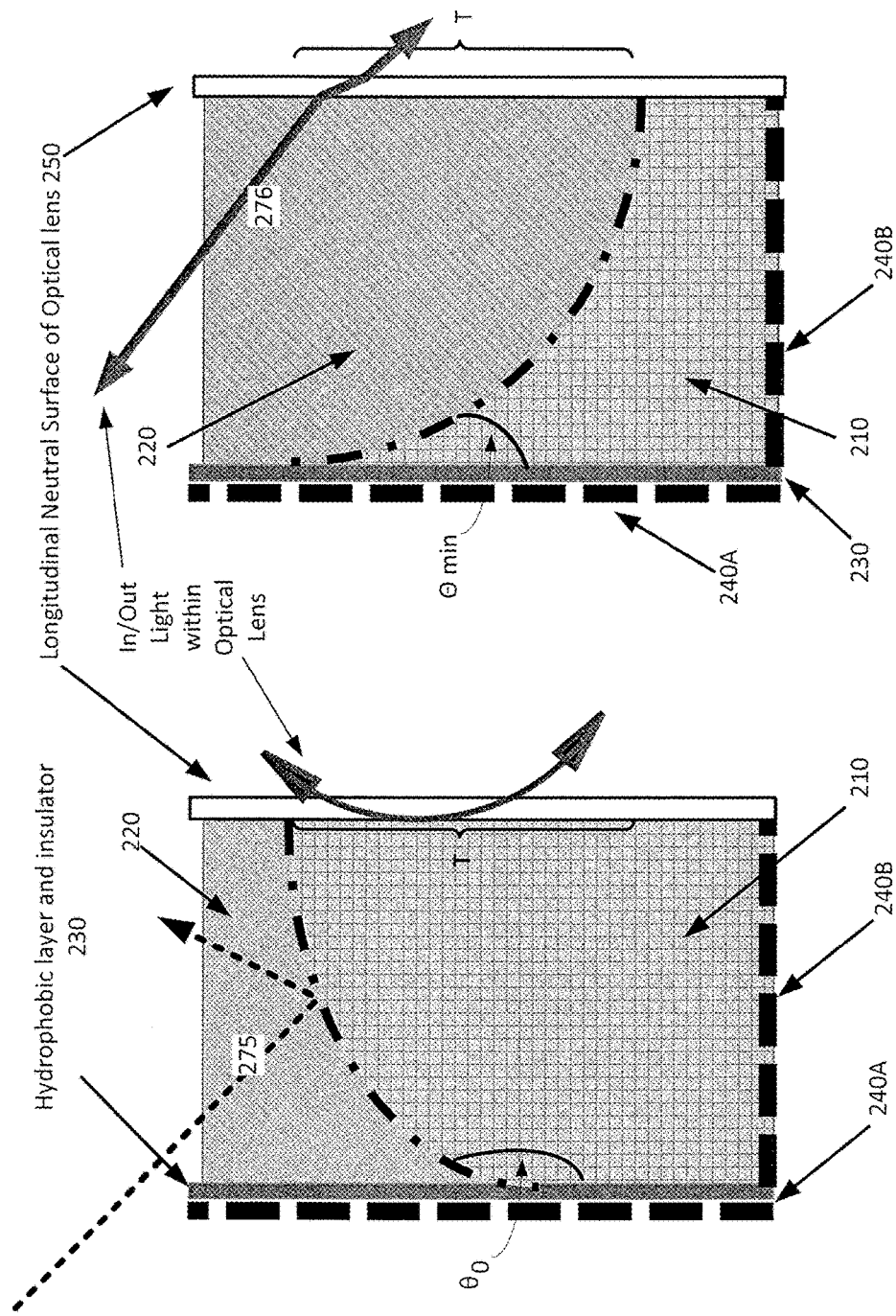
FIGS. 2A and 2B illustrate in cross-section the working principles of an electrowetting cell usable in the examples described herein.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a lens assembly with variable TIR properties usable to output light that is input from a light source, a lighting device that uses lens assembly, a lens assembly, an apparatus, and an optical/electrical transducer apparatus. In several of the following examples, a refractive interface between a static lens and fluids within an electrowetting cell will be described as being a high index of refraction-to-a high index of refraction interface (i.e., high-to-high refraction interface). However, in order for the desired TIR effects (such as suppressing the TIR) to be obtained, the refraction interface does not necessarily need to provide an exact high-to-high ratio of indices of refraction. The suppression of the TIR effect may be obtained by using equal, or substantially equal, indices of refraction at the refraction interface between the static lens and the electrowetting cells. For example, the refraction index interface ratios may be high-to-high, high-to-any higher, high-to-slightly lower, and the like. The index of refraction ratio at the refraction interface for providing the desired TIR effect may be determined using Fresnel's equations. For ease of explanation, the interface will be referred to as a high-to-high refraction interface when the high index of refraction liquid is positioned along the neutral surface of the optical lens.

The described examples use a variable lens assembly that includes an optical lens, an electrowetting cell and electrodes. The optical lens is formed from a high index of refraction, transparent material, and has an exterior wall between an optical interface and an optical aperture. The electrowetting cell includes a wall coupled to the exterior wall of the optical lens to form a fluidic sealed cell there between. A high index of refraction liquid and a low index of refraction liquid are contained within the sealed cell by the wall and the optical lens exterior wall. The high index of refraction liquid and the low index of refraction liquid are immiscible, and at least one of the liquids is electrically conductive. The electrodes are coupled to the optical lens exterior wall and also receive control signals. The electrodes are configured to cause the high index of refraction liquid and the low index of refraction liquid to assume positions within the sealed cell along the optical lens exterior wall. In response to a control signal applied to the electrodes, the positions of the high index of refraction liquid and the low index of refraction liquid change to alter optical characteristics of the lens assembly.

In a more specific example, the variable lens assembly includes an electrowetting cell that contains fluids having different indices of refraction, which respond to electrowetting signals to change positions of the fluids within the electrowetting cells. The variable lens assembly also includes a structurally static lens that is made from a transparent material having a high index of refraction of a fixed shape. Light is received from a light source via an optical input of the lens. When the fluids of the electrowetting cell are in one state, for example, the optical interface between the fluid system of the electrowetting cell and the exterior surface of the transparent material of the lens is a high-to-low index of refraction interface. In such a state, the light from the light source is traveling from a high index of refraction material of the lens toward a low index of refraction fluid. As a result of the high-to-lower index of refraction interface, substantially all of the light within the static lens that encounters the interface is reflected back into and toward an output of the lens by TIR. In this state, the lighting assembly has predetermined optical characteristics. However, when the appropriate electrowetting signals are provided, or applied, the fluid system of the electrowetting cell changes to another state. The other state of the electrowetting cell causes the optical interface between the electrowetting cell and the exterior wall surface of the transparent material to change to lower-to-low index of refraction interface. In other words, the index of refraction of the transparent material is now higher than the fluid index of refraction presented by the fluid of the exterior wall. As a result, the light within the lens material passes through the interface out to the lens (without TIR). In the other state, the lighting assembly has other optical characteristics different from the predetermined optical characteristics.

In another specific example, a detection device is disclosed that utilizes a variable lens assembly and a transducer configured as a light detector. The variable lens assembly includes a structurally static lens and a controllable electrowetting assembly. The structurally static lens is formed of a transparent material that has a first index of refraction in a fixed shape. The static lens includes a lens interface and an optical aperture. An exterior wall of the static lens extends from a portion of the lens interface to a portion of the optical aperture. The optical aperture acts as a light input and the lens interface is the light output. The electrowetting assembly surrounds the transparent lens and includes a high index of refraction liquid and a low index of refraction liquid within sealed container walls. The low index of refraction liquid is responsive to the electrowetting signals, to vary the amount of the exterior wall of the transparent lens covered by the low index of refraction liquid and cause total internal reflection of light within the transparent lens to thereby vary a direction and/or shape of light received via an electrowetting optical aperture and/or an optical lens aperture. The transducer converts optical energy into an electrical signal. A signal interface provides the electrowetting signals to electrodes coupled with at least the low index of refraction liquid of the electrowetting assembly and also receives electrical signals generated by the transducer in response to any detected light.

Reference is now made in detail to the examples illustrated in the accompanying drawings and discussed below. FIG. 1 illustrates a cross-sectional view of a general example of a variable optical lens assembly utilizing an electrowetting cell.

The example of FIG. 1 provides a lens assembly 100 that includes an optical lens 110, a controllable electrowetting assembly 150, and an lens interface 130. The optical lens 110, for example, is a structurally static lens that includes the lens interface 130, the optical aperture 135 and the longitudinal neutral surface, or exterior wall, 113. The optical lens 110 is a lens made of a transparent material having a first index of refraction, and is coupled to an optical/electrical transducer 174 via the lens interface 130. The optical aperture 135 outputs light from, or receives light provided to, the optical/electrical transducer 174 from the optical lens 110. In general, the lens assembly 100 may have predetermined optical characteristics based on a configuration of the transparent, optical lens 110.

An optical/electrical transducer 174 is a device that converts between forms of optical and electrical energy, for example, from optical energy to an electrical signal or from electrical energy to an optical output. Examples of electrical-to-optical transducers include various light emitters, such as a light emitting diode (LED) semiconductor, a plasma-based light emitter semiconductor, or an output of a fiber optic cable. In some examples, the emitted light may be in the visible spectrum or in other wavelength ranges. The lens assembly 100 depending upon its configuration has a transducer that emits light, such as light source 175 (described in more detail with reference to FIGS. 4A, 5A and 6A), for output in various directions and beam shapes.

Examples of optical-to-electrical transducers include various semiconductor-based photo-sensitive sensors, such as a photodetector, photovoltaic devices and the like. For example, the photoreceptive transducer 176 (described in more detail with reference to FIGS. 4B, 5B and 6B) may be configured with an optical energy sensor or detector, e.g. for UV, visible light, infrared, near-infrared, or the like; and with a photovoltaic device for generating power in response to received optical energy in a desired spectral range.

A device is also envisioned in which a transducer performs both light emitting functions and light detection functions. Such a dual-function device may operate through a multiplexing or time-division arrangement in which the function of the device changes based on predetermined conditions (e.g., time of day, calendar day, temperature or the like) or a setting (e.g., light detection or light emission.)

In this example, the structurally static optical lens 110 is formed from a transparent material having a first index of refraction. For example, the optical lens 110 may be made from a high index of refraction transparent material, such as glass, silicon as provided, for example, from Dow Corning™, a polycarbonate, an acrylic, other plastics or other optical quality transparent material. These materials are usable in the visible light and near infrared spectrums other materials may be used when the light is in the infrared or ultraviolet spectrums. The optical lens 110 has an neutral surface 113 between the lens interface 130 and an optical aperture 135. The neutral surface 113 extends from a portion of the lens interface 130 to a portion of the optical aperture 135. The optical lens 110 may have a structurally static shape (when viewed in cross section that is curved, cylindrical, parabolic, pyramidal, frustum, or a combination of shapes (e.g., parabolic near the optical input 110 and cylindrical closer to the optical aperture 135). When viewed from the optical aperture 135 or the lens interface 130, the optical lens 110 may have a substantially circular, oval shaped polygonal or the like. In some examples, the neutral surface 113 forms a common wall with the electrowetting cells 120.

The controllable electrowetting assembly, shown as 150A and 150B, spaced from the transparent optical lens 110 includes sealed container walls 141-147 spaced about, or around, the transparent optical lens 110 that form a fluidic sealed, or fluidic leakproof, cell; a high index of refraction liquid 163 and a low index of refraction liquid 165 contained in the sealed cell; electrowetting optical apertures 125; and electrodes (collectively, 155) coupled via signal interface 180 to a controller (not shown). Although the sealed container walls 141-147 refer to several walls, the sealed container walls may include at least one wall. The interior of sealed container walls 141 and 145 may also include a hydrophobic surface and insulator layer 88 opposite the exterior walls of the optical lens 110. In some examples, the hydrophobic surface and insulator layer 88 may include, or be formed from, a reflective material, such that the hydrophobic surface and insulator layer 88 is reflective. The electrodes 155 may be associated with a respective container wall 141 or 145, and may be positioned between the hydrophobic surface and insulating layer 88 and the respective container wall. The electrodes 155 are coupled to the signal interface 180 and a controller (shown in another example). In another example, the electrodes 155 (e.g., anode) are associated with wall 145, and electrodes 154 (e.g., cathode) may be associated with the surface of the electrowetting optical aperture 125. When positioned in association with the electrowetting optical aperture 125, the electrodes 154 may be formed from a transparent material, such indium tin oxide (ITO) or the like, that does not substantially alter the optical characteristics and/or operation of the lens assembly 100. The other examples discussed below may also incorporate the electrodes 154; however, for ease of illustration and discussion, the electrodes 154 are only shown and discussed with reference to FIG. 1. In addition, while the electrowetting cell(s) 120 is described as fluidically sealed or leakproof, the electrowetting cells may not completely sealed. For example, a vented electrowetting cell may be provided that still maintains the fluidic/leakproof properties (e.g., non-spill) of the electrowetting cell 120, but allows the interior of the cell to vent to the environment.

An electrowetting cell, such as the one or more electrowetting cells 120, is a sealed container that contains the high index of refraction liquid, or fluid, 163 and the low index of refraction liquid, or fluid, 165. Note that the terms "liquid" and "fluid" as referred to herein are used interchangeably. The high index of refraction liquid 163 and the low index of refraction liquid 165 are immiscible, and one of the liquids is conductive and the other of the liquids may be an insulator, such as water and oil. An oil may be, for example, a silicon-based oil or the like. The one or more electrowetting cells 120 are controllable optical elements that change optical properties of the neutral surface (i.e., exterior wall) 113 of the lens assembly 100 based on control signals received via the interface 180, from a controller (not shown in this example).

The electrowetting cells 120 include an electrowetting cell optical aperture 125, which is a transparent wall, or transparent, optical output, that is substantially parallel to the optical lens aperture 135. The electrowetting optical aperture 125 extends outward from the optical lens aperture 135, and toward the container walls 141-145. The electrowetting cell optical aperture 125 outputs light from the optical electrical transducer 174 when the lens assembly 100 is appropriately configured, as will be explained in more detail with reference to other examples. The one or more sealed container walls 141-147 may be coupled to the neutral surface 113 of the optical lens 110. For example, a container wall may be coupled to the neutral surface 1 113 of the optical lens to form a fluidic sealed cell there between. The one or more sealed container walls 141-147 and the electrowetting cell optical aperture 125 may appear as continuous surfaces formed by molding the sealed container walls 141-147 with the neutral surface 113 of the optical lens 110. Alternatively, the one or more sealed container walls 141-147 electrowetting cell optical aperture 125 may be separate surfaces that are spaced apart coupled using bonding agents, such as adhesives or, material coupling methods, similar to welding or the like, to the exterior of the neutral surface 113 of the optical lens 110 to form the electrowetting cells 120. A leakproof intersection between the one or more sealed container walls 141-147 and the neutral surface 113 of the optical lens 110 form the electrowetting cell 120 of the electrowetting assembly shown as 150A and 150B with the electrowetting cell optical aperture 125 also serving as a sealed container wall.

A high index of refraction liquid 163 and a low index of refraction liquid 165 are contained within the sealed cell walls 141-147 and the neutral surface 113. The high index of refraction liquid 163 and the low index of refraction liquid 165 are immiscible liquids, such as oil and water, at least one of which is electrically conductive. In an example, the index of refraction of the high index of refraction liquid 163 is higher than the first index of refraction of the transparent optical lens 110, and the index of refraction of the low index of refraction liquid 165 is lower than the first index of refraction of the transparent optical lens 110.

An advantage of the disclosed examples is that the light output properties of the lens assembly 100 may be manipulated by control signals applied to the electrowetting assembly 150 to provide a variety of output light beam shapes, or to steer output light beams in directions different from a single lens assembly. For example, the electrowetting cells 120 may be controlled so that the lighting assembly 100 provides a narrow output beam of light in a first configuration, and upon receipt of the appropriate electrowetting control signals, assume another configuration that provides a wider output beam of light.

The cross hatched area labeled T is a transition area within the electrowetting cells 120 and, in order to control the position of the liquids 163 and 165 within the transition area T of the sealed electrowetting cells 120, electrodes 155 are coupled to the one or more walls of the electrowetting cells 120. Although, not shown in this example, when no control signals are applied, the transition area T may be equally, or substantially equally, filled with the high index of refraction liquid 163 and the low index of refraction liquid 165. The electrodes 155 may also be coupled to the interface 180, which receives control signals from an external controller (not shown in this example). For example, the electrodes 155 of the controllable electrowetting assembly extend along at predetermined positions along a length of the sealed container walls in a direction from the lens interface, 130 to the optical lens aperture 135 of the transparent optical lens 110.

In a general example, the high index of refraction liquid 163 and the low index of refraction liquid 165, in response to a received electrowetting control signal, assume positions, such as the position shown in the example and other positions within the transition region T of the electrowetting cell(s) 120 along the neutral surface 113 of the optical lens 110 that alter optical characteristics of the lens assembly 100.

The volumes of the high and low index of refraction liquids shown in respective FIGS. 1-11 are not shown to scale. In an actual system incorporating an electrowetting cell, the volumes of the respective volumes of the high 163 and the low 165 index of refraction liquids is conserved when the liquids change position within the electrowetting cells 120. An alternative implementation is also envisioned in which reservoirs (not shown) of the respective high index of refraction liquid and the low index of refraction liquid are fluidically coupled to the electrowetting cell 120 via a sealed arrangement. A controller (as described in later examples) may output respective control signals to a reservoir management system (not shown), such as a pumping mechanism, plunger vacuum, or the like. In response to the control signal, the reservoir management system may cause either the intake excess fluid from or the output additional fluid into the respective electrowetting cell(s) to provide an even greater range of optical characteristics.

FIGS. 2A and 2B illustrate working principles of an electrowetting lens usable in the examples described herein. The relationships of the high and low index of refraction liquids are shown in FIGS. 2A and 2B, which show a cross-sectional representation of the sealed container walls of the controllable electrowetting assembly, such as electrowetting cell 120 of FIG. 1. The sealed container walls of the electrowetting cell 120, in the illustrated example, contains a low index of refraction liquid 210, a high index of refraction liquid and the sealed container walls include a hydrophobic insulating layer 230. The low index liquid 210 could be an aqueous, or electrically conductive, liquid, such as water, and the high index liquid 220 is transparent and may be a silicone oil, or other oil. The hydrophobic insulating layer 230 may, for example, be formed from Parylene C™, a dielectric stack such as Al2O3/Parylene C™, or the like. The hydrophobic insulating layer 230 acts to diminish any residue from the respective liquids from remaining on the sealed container walls as the electrowetting assembly operates. In the examples of FIGS. 2A and 2B, the area to the right of the longitudinal neutral surface of the optical lens 250 is the transparent optical lens, such as 110. The electrodes 240A and 240B, for example, may be coupled to a signal source (not shown), such as a signal interface, a controller, a current source or voltage source. One of the electrodes, such as 240A, may be coupled to the voltage supply, and the other electrode, such as 240B, may serve as a ground or voltage supply return electrode. When a controller applies a control signal, such as an alternating-current (AC) voltage, between the electrodes 240A and 240B, a corresponding reaction between the liquids 210 and 220 is produced as explained in more detail below.

The high index 220 and low index 210 of refraction liquids interact within a sealed container according to the following equation:

$$\cos\theta = \cos\theta_0 + (\in V^2)/2\gamma d \qquad \text{Eq. (1)}$$

In equation (1), the variable θ represents the contact angle between the low index of refraction liquid 210 and the high index of refraction liquid 220. In FIG. 2A, the angle $\theta_0$ is the Young's angle, which is the contact angle when a voltage is not applied to the electrodes 240A and 240B. The angle $\theta_0$ is determined based on the properties of the liquids 210, 220 and the hydrophobic insulating material 230. The variable V represents a value of the voltage applied to electrodes 240A and 240B. The variable ∈ represents the dielectric constant value of the hydrophobic insulating material 230. The variable d represents the thickness of hydrophobic insulating layer 230. The variable γ represents the interfacial tension value between low index of refraction liquid 210 and high index of refraction liquid 220. All of the values of the variables are real numbers.

When a voltage is applied between electrodes 240A and 240B, the contact angle θ between the two liquids decreases. The contact angle θ decreases as the applied voltage increases until the contact angle θ reaches a saturation contact angle $\theta_{min}$ between the layer 230 and a separation surface (shown as a dash-dot-dash line) between the high index of refraction liquid 220 and low index of refraction liquid 210. In operation, the low index of refraction liquid 210 reacts to the voltage applied to the electrodes 240A and 240B which causes the low index of refraction liquid 210 to assume a position within the electrowetting cell thereby allowing the high index of refraction liquid 220 to fill the space evacuated by the low index of refraction liquid 210 adjacent to the transparent wall of the optical lens 250.

Depending upon a characteristic value of the applied voltage, such as magnitude or frequency, the low index of refraction liquid 210 and the high index of refraction liquid 220 may change positions within the transition region T (shown in brackets) of the sealed container. Depending upon the extent, or range, of the change in the position of the high index of refraction liquid 220, the optical properties of the transparent wall of the optical lens, such as for example 110 of FIG. 1, also change. Said differently, the high index of refraction liquid 220 has a first volume and the low index of refraction liquid 210 has a second volume. The volumes of the high index of refraction liquid 220 and the low index of refraction liquid 210 may be the same or different. Any alteration to the internal light reflection characteristics of the lens assembly when a control signal is received is based on the contribution of the ratio of the volume of the high index of refraction liquid to the volume of the low index of refraction liquid.

For example, when the electrowetting cells are in the state shown in FIG. 2A, the light within the optical lens is reflected along the transparent wall 250 of the optical lens and remains substantially within the optical lens. Recall the above stated general rule that light is reflected when transitioning from a high index of refraction medium to a low index of refraction medium. In addition, the optical lens is a high index of refraction medium. In addition, if the incident angle of the incoming light is larger than the critical angle (followed the Snell's law) at any of the interfaces, the light, such as 275 will be reflected; otherwise, if the incident angle of the incoming light is less than the critical angle the light will pass through the interface. As a result of the transition region T within the electrowetting cell being filled with the low index of refraction liquid 210, the light reflects and remains substantially within the optical lens and is output from the optical lens aperture. In this configuration, a lighting apparatus outputs a narrower beam of light at the optical lens aperture in response to the low index of refraction liquid extending over a larger area of the one or more transparent lens wall than an area of the one or more transparent lens walls covered by the high index of refraction liquid. When the lens assembly is configured for use as a detector for detecting light and the liquids 210 and 220 are in the state shown in FIG. 2A, the lens assembly has a narrow field of view as light that enters an electrowetting aperture is substantially reflected (see Dashed Arrow 275) within the electrowetting cell due to the interface of the high index of refraction liquid 220 with the low index of refraction liquid 210. As a result, light that enters the electrowetting aperture may not deliver any appreciable amount of light to the optical lens interface and optical electrical transducer. In this configuration, light that enters the optical lens aperture is directed by the combination of the electrowetting cells configuration shown in FIG. 2A and the optical lens toward the lens interface (not shown in this example).

Conversely, when the state of the high index of refraction liquid 220 and the low index of refraction liquid 210 changes to the state shown in FIG. 2B, the light from the optical lens is able to pass through to the electrowetting cell. The light is able to pass because the transition region T is now filled with the high index of refraction liquid 220, which creates a high index of refraction-to-high index of refraction that enables the light to pass through the electrowetting cell and out a transparent top portion of the electrowetting cell, such as 155. In this configuration, a lighting apparatus outputs a wider beam of light at the optical lens aperture in response to the high index of refraction liquid extending over a larger area of the one or more transparent lens than an area of the one or more transparent lens walls covered by the low index of refraction index liquid.

In response to different electrowetting control signals applied to one or more of the electrodes 155, the lens assembly 100 is configured to generate a narrower beam of light at the optical aperture in response to the low index of refraction liquid 165 extending over a larger area adjacent to the optical lens than the high index of refraction index liquid 163. In other words, in response to an electrowetting control signal, the high index of refraction liquid 165 and the low index of refraction liquid 163 change positions within the electrowetting cell thereby altering internal light reflection characteristics of the lens assembly.

When the lens assembly configured for use as a detector for detecting light and the liquids 210 and 220 are in the state shown in FIG. 2B, the lens assembly has a wider field of view as light that enters an electrowetting aperture is substantially passed (see solid Arrow 276) within the electrowetting cell. As a result, light that enters the electrowetting aperture or the optical lens aperture when the lens assembly is configured as explained with reference to the example of FIG. 2B delivers light to the optical lens interface and optical electrical transducer.

The following examples illustrate the operation of the foregoing general rule with respect to the lens assembly, such as lens assembly 100 of FIG. 1.

Figure 3:
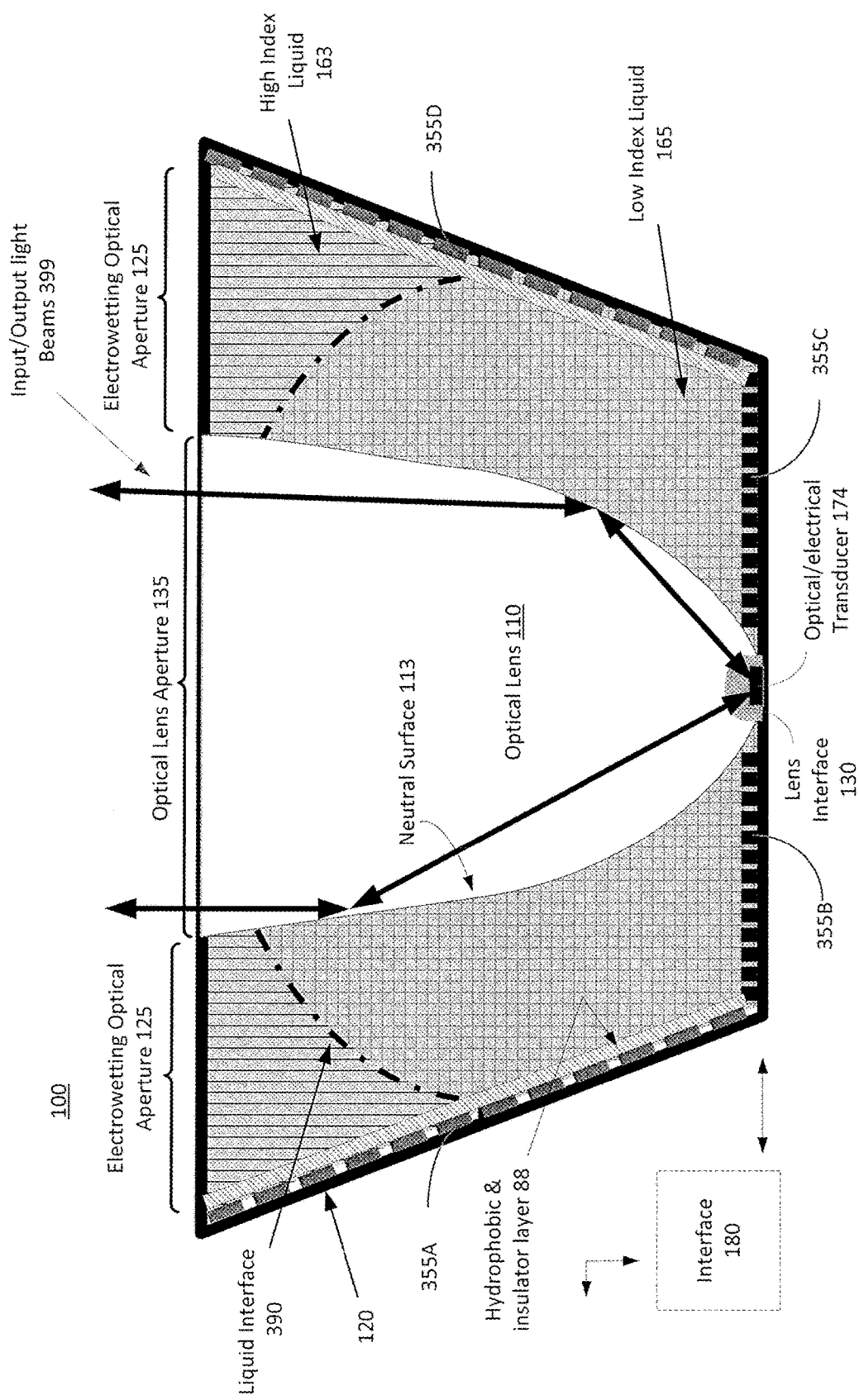
FIG. 3 is a cross-sectional view of an example of a device having a variable TIR lens configured to detect light over a narrow field of view and/or output a narrow beam of light.

FIG. 3 is a cross-sectional view of an example of a device having a variable optical lens configured to output and/or receive a narrow beam of light. In such a device, different components may perform opposite functions. For example, when the transducer 174 is a light source, the lens interface 130 acts as a light input to the optical lens 110 and the optical aperture 135 and electrowetting aperture 125 act as light output. Conversely, when the transducer 174 is a light detector, the optical aperture 135 and electrowetting aperture 125 act as light inputs to the optical lens 110 and the lens interface 130 acts as a light output from the optical lens 110 to the transducer 174. In the example of FIG. 3, the signal interface 180 receives electrowetting signals that when applied to the electrodes 355A-355D cause the low index of refraction liquid 165 and the high index of refraction liquid 163 to assume the approximate positions shown in FIG. 3 with the liquid interface 390 between the two liquids. For example, electrodes 355B and 355C may be ground electrodes and electrodes 355A and 355D may have substantially the same electrowetting signals applied from a controller via the signal interface 180. While the electrodes 355B and 355C are shown opposite the apertures 125 and 135, it is envisioned in some examples that the electrodes may be substantially co planar with the apertures 125 and 135, and also be transparent or substantially transparent. The electrodes 355A and 355D may be associated with a respective exterior container wall of the electrowetting cell 120, and may be positioned between the hydrophobic surface and insulating layer 88 and the respective container wall.

Recall that the optical lens 110 is made from a high index of refraction material, and that when light traversing a high index of refraction material intersects with a material, such as liquid 165, having a lower index of refraction, any received or emitted light is reflected at the boundary of the two materials. As shown in FIG. 3, when the lens assembly 100 is being used for light emission, the optical/electrical transducer 174 is a light source. The light output by the optical/electrical transducer 174 light source is input into the optical lens 110 via the lens interface 130 intersects with the longitudinal neutral surface 113 at a number of different angles of incidence. Similarly, when the lens assembly 100 is being used for light detection, any light input into the optical lens 110 via the optical lens aperture 135 also intersects with the longitudinal neutral surface 113 at a number of different angles of incidence. In either case, the incident light (from the high index of refraction optical lens 110) passes through the longitudinal neutral surface 113 and intersects with the low index of refraction liquid 165.

As a result of the difference in refractive indexes between the optical lens 110 and the low index of refraction liquid 165, a substantial amount of the incident light is reflected from the low index of refraction liquid 165 back into the optical lens 110. As a result, when the light is emitted by the transducer 174, the reflected light is output from the optical lens aperture 135 in a narrow beam as output light 399. The narrow beam of output light 399 is output through the optical lens aperture 135 in a direction substantially perpendicular to a vertical axis of the optical lens 110. In this particular example, a narrow beam of light including light 399 is output only from the optical lens aperture 135. Similarly, when light from the environment in which the device is located is received via the optical lens aperture 135, the reflected input light (also illustrated as light beam 399) is directed inward to the lens interface 130 which further directs the incoming light beam 399 toward the optical/ electrical transducer 174. The optical/electrical transducer 174, when configured as a detector, converts the incident light into an electrical signal for output to the signal interface 180.

As shown in the example of FIG. 3, when the lens assembly 100 is being used for light emission, the shape and/or direction of light output via the electrowetting optical lens aperture and/or the optical lens aperture is varied to produce a narrower output beam of light output in response to the low index of refraction liquid extending over a larger amount of the transparent lens wall than the high index of refraction index liquid. Similarly, when the lens assembly 100 is being used for light detection, the direction of light input via the electrowetting optical lens aperture 125 and/or the optical lens aperture 135 are varied to produce a narrower field of view in response to the low index of refraction liquid extending over a larger amount of the transparent lens wall than the high index of refraction index liquid. In other words, the liquid interface 390 minimizes the amount of light that enters the optical lens 110 through the electrowetting cell 120.

Figure 4A:
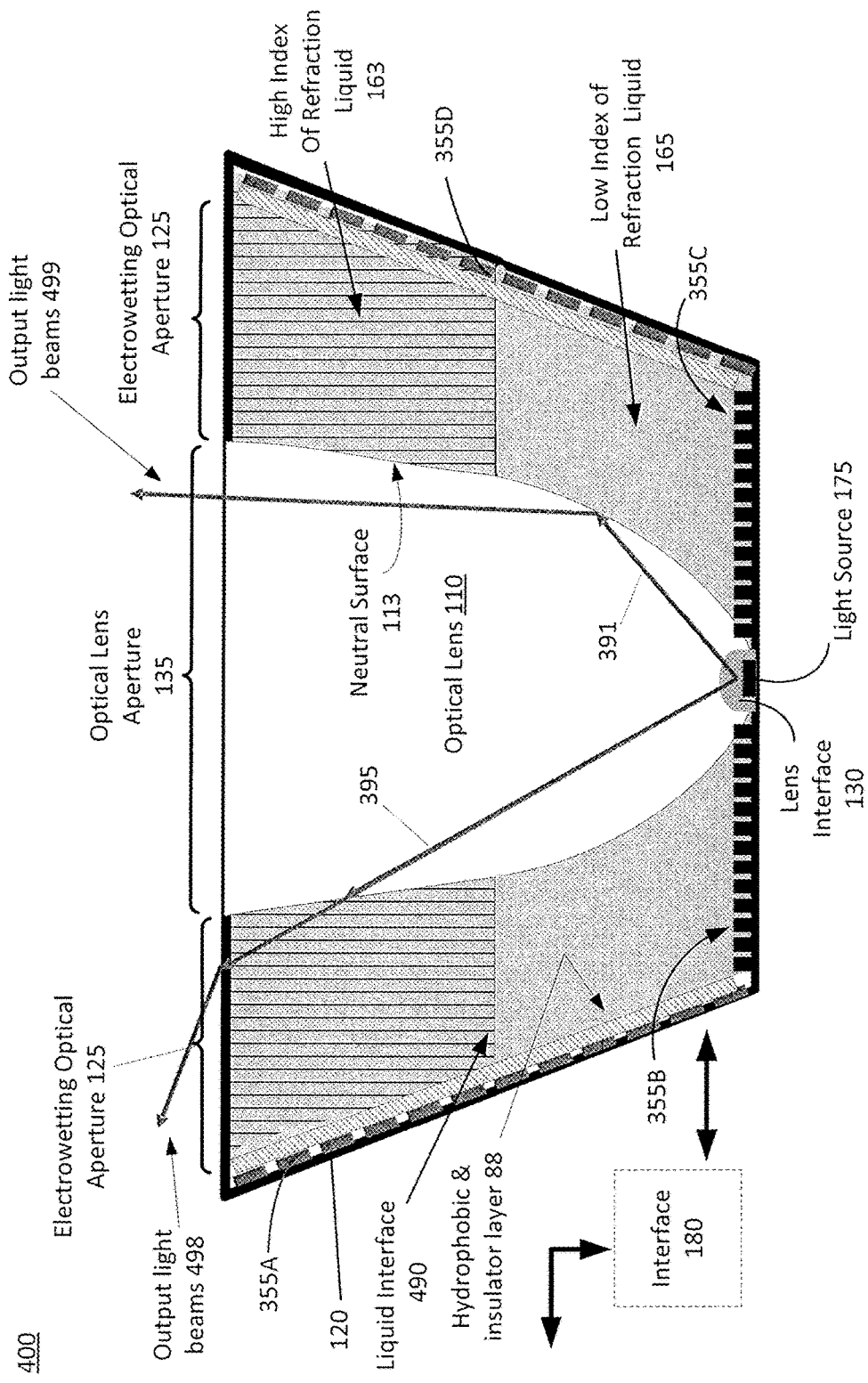
FIG. 4A is a cross-sectional view of an example of a lighting device having a variable TIR lens when configured to output an intermediate beam of light.

However, other beam steering and/or shapes or light detection fields of view are also contemplated such as an intermediate beam shape/field of view. Examples of a variable TIR lens assembly configured to provide an intermediate beam shape or an intermediate field of view for light detection are illustrated respectively in FIGS. 4A and 4B. In the example of FIG. 4A, the lens assembly 400 is configured for use with a transducer 175 that emits light. In this configuration, the electrowetting optical aperture 125 and the optical lens aperture 135 are light outputs of the electrowetting cells 120 and the optical lens 110, respectively, and the lens interface 130 is a light input to the optical lens 110 for light emitted by the light emitting transducer 175. In the example, the signal interface 180 receives electrowetting signals that when applied to the electrodes 355A-355D cause the low index of refraction liquid 165 and the high index of refraction liquid 163 to assume the approximate positions shown in FIG. 4A with the liquid interface 490 between the two liquids. For example, electrodes 355B and 355C may be ground electrodes and electrodes 355A and 355D may respond to the electrowetting signals received from a controller (not shown in this example) via the interface 180. As mentioned with reference to FIG. 3, the electrodes 355A and 355D may be associated with a respective exterior container wall of the electrowetting cell 120, and may be positioned between the hydrophobic surface and insulating layer 88 and the respective container wall.

The interface 180 also outputs signals to the light source 175 based on transducer control signals received from the controller. The light emitted by the light source 175 into the lens interface 130 is output from the lens interface 130 into the optical lens 110 at various angles. Some of the light input to the lens interface 130 enters the optical lens 110 at shallower angles, such as light 391. In the illustrated example, the light 391 when exiting from the neutral surface 113 of the optical lens 110 intersects the low index of refraction liquid 165. As a result, the light 391 is reflected back into the optical lens 110 and output through the optical lens aperture 135 as output beam 499. In addition, light output by the light source 175 also enters the optical lens 110 at higher angles, such as light 395. Light 395 output from the optical lens 110 intersects the high index of refraction liquid 163 when exiting the optical lens 110. As a result, the light 395 is passed through the high index of refraction liquid 165 at an angle substantially equal to the angle of incidence with the longitudinal neutral surface 113, and is output through the high index of refraction liquid 163 as output beam 498.

Figure 4B:
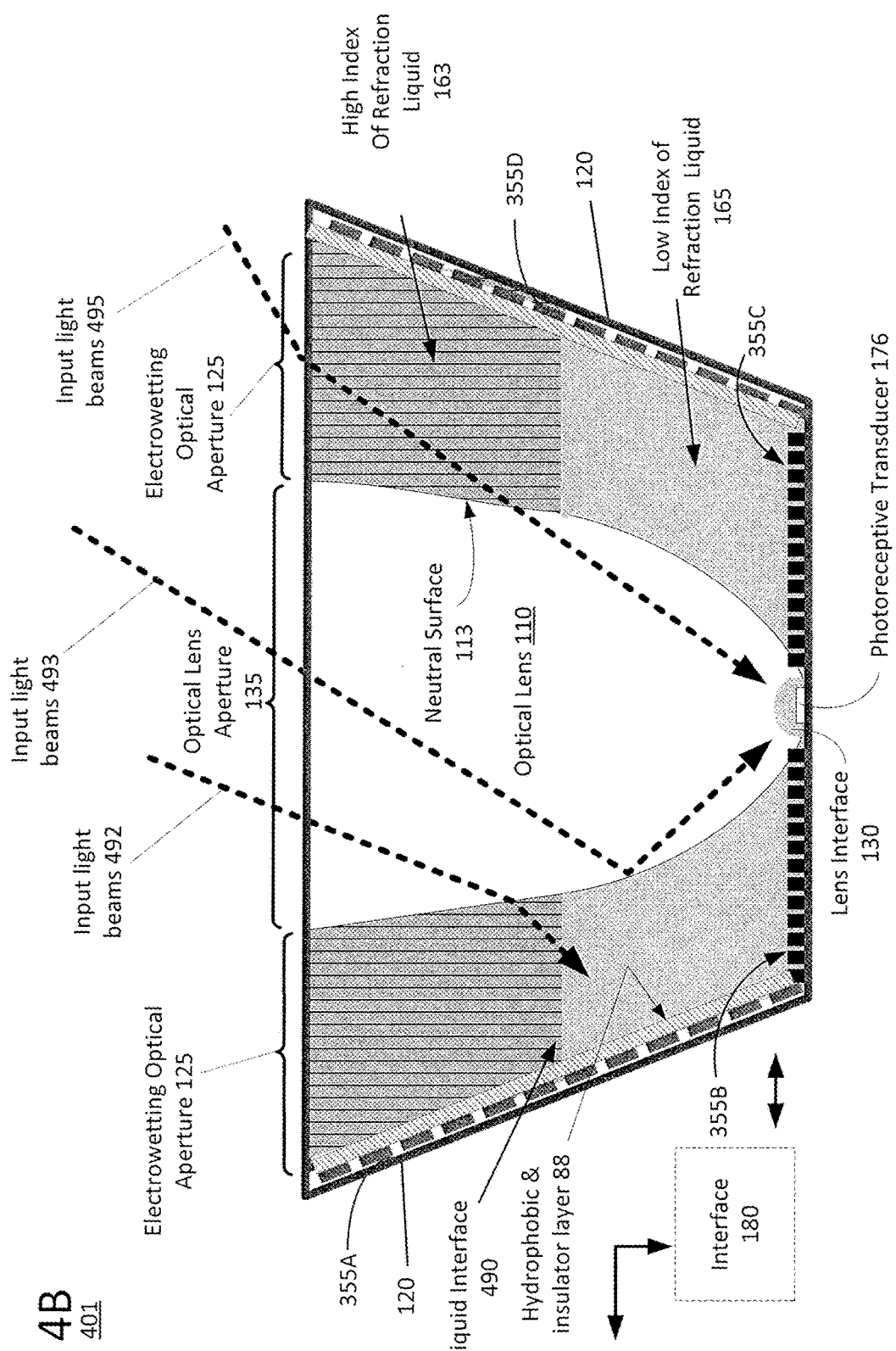
FIG. 4B is a cross-sectional view of an example of a light detection device having a variable TIR lens configured to receive light in an intermediate field of view.

FIG. 4B is a cross-sectional view of an example of a light detection device having a variable TIR lens configured to receive light in an intermediate field of view. In the example of FIG. 4B, the photoreceptive transducer 176 is configured to detect light, and based on the lens assembly configuration 401 may have an intermediate field of view. In this configuration, the electrowetting optical aperture 125 and the optical lens aperture 135 are light inputs of the electrowetting cells 120 and the optical lens 110, respectively, and the lens interface 130 outputs light from the optical lens 110 for detection by the photoreceptive transducer 176. The photoreceptive transducer 176 generates electrical signals in response to the detected light that are output to the signal interface 180.

For example, input light, represented by light beam 492, enters the optical lens 100 through the optical lens aperture 135 and intersects the neutral surface 113 at a point at which the high index of refraction liquid 163 is located along the neutral surface 113. As a result, some of the input light, such as light represented by arrow 492, passes through the neutral surface 113 of the optical lens 110, and enters the electrowetting cell 120. When inside the electrowetting cell 120, the input light 492 may further reflect, but is essentially input light that is undetectable by the photoreceptive transducer 176. Conversely, other input light, represented by arrow 493 enters the optical lens aperture 135 at a steeper angle than input light 492, and intersects with the neutral surface 113 at a point at which the low index of refraction liquid 165 is located along the neutral surface 113. As a result, the input light beam 493 is reflected toward the lens interface 130 and photoreceptive transducer 176. Hence, the low index of refraction liquid 165 is responsive to the electrowetting signals output from the signal interface 180, to vary an amount of the exterior wall of the transparent lens 110 covered by the low index of refraction liquid 165 and cause total internal reflection of light within the transparent lens 110 to thereby vary a direction and/or shape of light received via the electrowetting optical aperture 125 and/or the optical lens aperture 135. In another example, the light beams 495 enter the electrowetting optical aperture 125 passing into a region occupied by the high index of refraction liquid 163. Since the interface between the electrowetting optical aperture 125 and the external environment of the light assembly, in this case, air, is a low-to-high index of refraction interface, the input light beams 495 are reflected toward the optical lens 110. In such an example, the light beams 495 pass through the high index of refraction liquid 163 and the neutral interface 113. The interface between the high index of refraction liquid 163 and the optical lens 110 is a high-to-high index of refraction interface so the light beam 495 passes substantially unimpeded toward the lens interface 130 and the transducer 176. In addition, the incident angle of the input light 495 must be considered. For example, in order for the input light beam 495 to pass through both the low-to-high index of refraction interface (between the electrowetting optical aperture 125 and high index of refraction liquid 163 of the electrowetting cell 120) and the high-to-high index of refraction interface (between the high index of refraction liquid 163 and the optical lens 110), the incident angle of the input light 495 must be, according to Snell's Law, less than the critical angle.

In some examples, the lighting assembly 100 is configured, in response to control signals applied to one or more of the electrodes 355A-355D to also output wider beams of light out of the optical aperture 135 and the electrowetting apertures 125, or receive light over a wider field of view, in response to the high index of refraction liquid 163 extending over a larger area adjacent to the optical lens than the low index of refraction index liquid 165. The electrodes 355A and 355D may be associated with a respective exterior container wall of the electrowetting cell 120 and may be positioned between the hydrophobic surface and insulating layer 88 and the respective container wall.

Figure 5A:
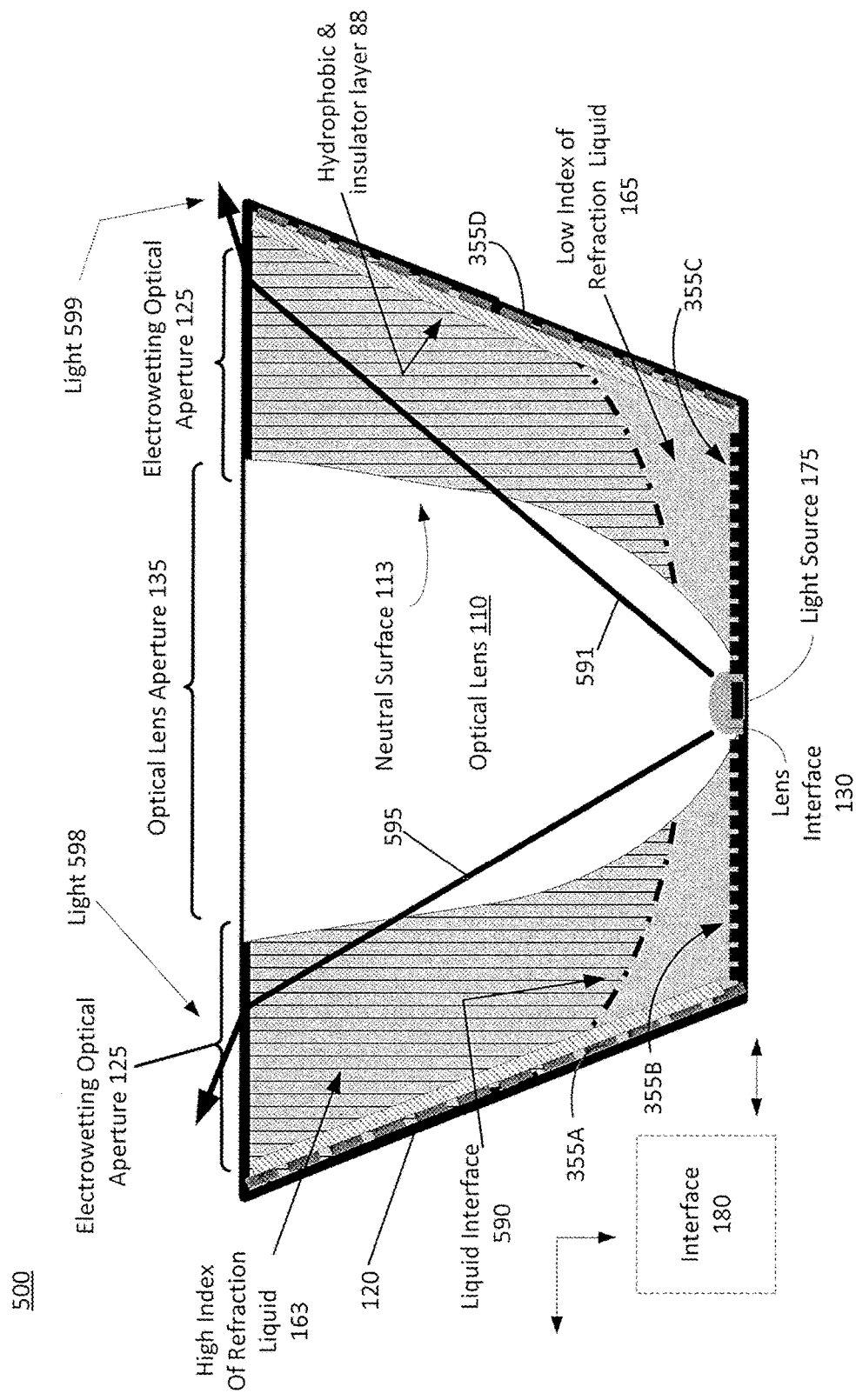
FIG. 5A is a cross-sectional view of an example of a lighting device having a variable TIR lens when configured to output a wide beam of light.

FIG. 5A is a cross-sectional view of an example of a lighting device having a variable optical lens configured to output a wide beam of light. In the example of FIG. 5A, the interface 180 receives control signals that when applied to the electrodes 355A-355D cause the low index of refraction liquid 165 and the high index of refraction liquid 163 to assume the approximate positions shown in FIG. 5A with the liquid interface 590 between the two liquids. For example, electrodes 355B and 355C may be ground electrodes and electrodes 355A and 355D may respond to control signals received from a controller via the interface 180. The electrodes 355A and 355D of FIGS. 5A and 5B may be associated with a respective exterior container wall of the electrowetting cell 120, and may be positioned between the hydrophobic surface and insulating layer 88 and the respective container wall.

In the example of FIG. 5A, the light source 175 is configured as a light emitter. The light emitted by the light source 175 is received by the lens interface 130 and input into the optical lens 110 at various angles. In other words, in the example of FIG. 5A, light is input into the optical lens 110 through the lens interface 130 and is output through the optical aperture 135, the electrowetting aperture 125, or both. Some of the light input via the lens interface 130 enters the optical lens 110 at shallower angles, such as light 591. In the illustrated example, the light 591 output from the optical lens 110 intersects the high index of refraction liquid 163 when exiting the optical lens 110. As a result, the light 591 is passed through the longitudinal neutral surface 113 of the optical lens 110 and output through the electrowetting optical aperture 125 as output beam 599. In addition, light output by the light source 175 also enters the optical lens 110 at higher angles, such as light 595. Light 595 output from the optical lens 110 intersects the high index of refraction liquid 163 after exiting the longitudinal neutral surface 113 of the optical lens 110. As a result of the positions of the liquids 163, 165 in the electrowetting cells 120, the light 591 and 595 is passed through the high index of refraction liquid 163 at an angle substantially equal to the angle of incidence with the longitudinal neutral surface 113, and is output from the respective electrowetting optical aperture 125 as output wide beams 598 and 599.

As a result of the configuration shown in FIG. 5A, the direction and/or shape of light output via the electrowetting optical aperture 125 and/or the optical lens aperture 135 is varied to produce a wider beam of output light in response to the high index of refraction liquid 163 extending over a larger amount of the transparent lens wall of the optical lens 110 than the low index of refraction index liquid 165.

FIG. 5B is a cross-sectional view of an example of a light detection device having a variable TIR lens configured to receive light in a wide field of view.

In the example of FIG. 5B, the variable lens assembly 501 is coupled to a photoreceptive transducer 176. The variable lens assembly 501 includes a structurally static lens 110 formed of a transparent material having a first index of refraction in a fixed shape. Similar to the example of 5A, the static optical lens 110 includes a lens interface 130 and a controllable electrowetting cell 120. However, in contrast to the variable lens assembly example of FIG. 5A, light in the variable lens assembly example of FIG. 5B is input into the optical aperture 135, electrowetting apertures 125A and/or 125B and light is output from the lens interface 130.

In the light detector example of FIG. 5B, input light 598 and 599 enter the electrowetting cell 120 through the light inputs, electrowetting optical apertures 125 and the optical lens aperture 135, and intersect the neutral surface 113 at a point at which the high index of refraction liquid 163 is located. As a result, the input light 598 and 599 pass through the neutral surface 113 of the optical lens 110, and enter the optical lens 100 now shown as light beams 595 and 591, respectively. The input light 595 and 591 is further directed toward the photoreceptive transducer 176 by the lens interface 130 for detection by the transducer 176. While input light 598 and 599 is shown entering only via the electrowetting optical apertures 125 in the wide field of view example of FIG. 5B, it should also be understood that the input light enters the lens assembly 501 across the full width of the electrowetting optical apertures 125 and the optical lens 135. In addition, the angles of incidence of the input light 595 and 599 must be considered. For example, in order for the input light 595 and 599 to respectively pass through both the low-to-high index of refraction interface (between the electrowetting optical aperture 125 and high index of refraction liquid 163 of the electrowetting cell 120) and the high-to-high index of refraction interface (between the high index of refraction liquid 163 and the optical lens 110), the incident angle of the input light 595 (shown within circle A) and input light 599 (shown within circle B) must be, according to Snell's Law, less than the critical angle.

Figure 6A:
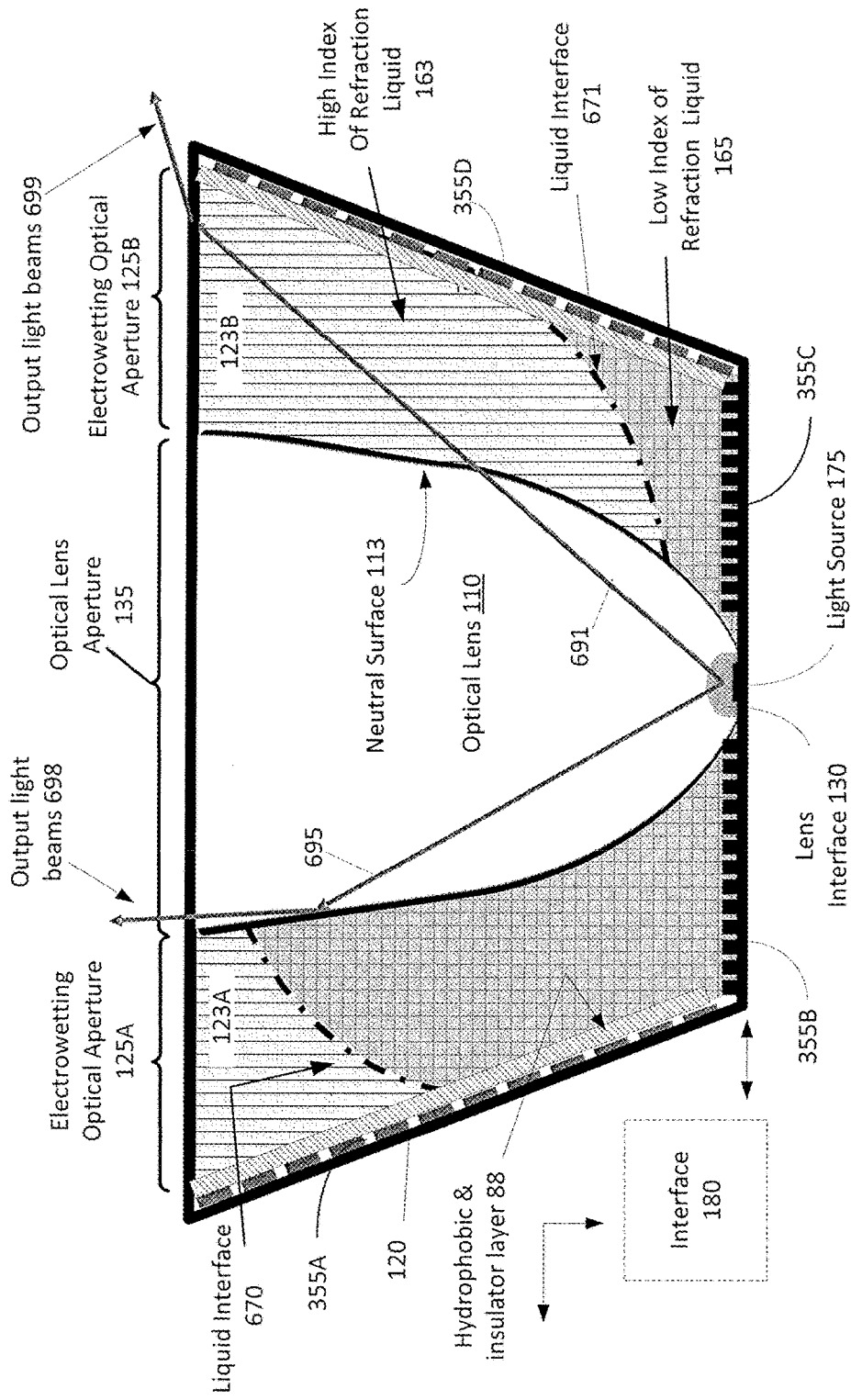
FIG. 6A is a cross-sectional view of an example of a lighting device having a variable TIR lens when configured to steer an output beam of light in a specific direction.

While the examples of FIGS. 3, 4A and 5A illustrated controllable output light beam shaping, the example illustrated in FIG. 6A shows a lighting assembly controlled to provided beam steering.

FIG. 6A is a cross-sectional view of an example of a lighting device having a variable TIR lens when configured to steer an output beam of light in a specific direction. The structure of the lighting assembly 600 is similar to the structure described above with reference to FIG. 1. In particular, the one or more electrowetting cells, collectively referred to as 123, as shown in FIG. 6A have two separately controllable portions, 123A and 123B, for ease in explaining the differences in the response to the voltages applied at the respective electrodes 355A-355D. Similarly, the transparent electrowetting optical output, collectively referred to as 125 of previous examples is now referred to as 125A and 125B to facilitate easier description of the configuration differences of FIG. 6A as compared to the previous examples of FIGS. 1, 3A, 4A and 5A. FIGS. 6A and 6B also show a hydrophobic surface and insulator layer 88 on the walls of the electrowetting cell 120 that is opposite the exterior walls of the optical lens 110. In some examples, the hydrophobic surface and insulator layer 88 may include, or be formed from, a reflective material, such that the hydrophobic surface and insulator layer 88 is reflective. Discussion of some of the structural details of similarly labeled elements is omitted in the following discussion since the functional aspects of those elements in the examples of FIGS. 6A and 6B are unchanged from the previous examples.

In the example of FIG. 6A, the interface 180 receives electrowetting signals that are applied as electrical voltages or currents to the electrodes 355A-355D. The interface 180 may also receive control signals for sending signals to, or receiving signals from, the light source 175. The interface 180 may be configured to determine (using, for example, electronic circuitry, firmware, or a microprocessor) which electrodes are to have a voltage (or current) applied in response to the received electrowetting signals. Alternatively, the interface 180 may simply be a connector board that facilitates a wired connection to the optical assembly 600 including electrodes 355A-D and light source 175. The electrodes 355B and 355C may be ground electrodes and electrodes 355A and 355D may be control electrodes. In more detail, a electrowetting signal is received at the interface 180 from a controller (not shown in this example). In response to the received electrowetting signal, the interface 180 applies a first voltage between control electrodes 355A and 355B on the 123A portion of the electrowetting cell 120 that causes the low index of refraction liquid 165 to assume a position along the transparent wall of the optical lens 110 shown by the liquid interface 670. Also, in response to the received electrowetting signals, the interface 180 applies a second voltage to electrodes 355C and 355D on the 123B portion of the electrowetting cell 120 that causes the low index of refraction liquid 165 to assume a position along the transparent wall (i.e., longitudinal neutral surface 113) of the optical lens 110 shown by the liquid interface 671.

The light output by the light source 175 into the lens interface 130 is dispersed at various angles when output from the lens interface 130 into the optical lens 110. Some of the light output from the lens interface 130 enters the optical lens 110 at shallower angles, such as light 691. With the liquids 163 and 165 configured in the respective electrowetting cells 123A and 123B as shown, the emitted light 691 exits the optical lens 110 and passes through the longitudinal neutral surface 113 and intersects the high index of refraction liquid 163. As a result of passing from a high index of refraction medium (i.e., optical lens 110) into another high index of refraction medium (i.e., high index of refraction liquid 163), the light 691 passes through the longitudinal neutral surface 113 of the optical lens 110 without substantial refraction, enters the electrowetting cell 123B, and is output through the electrowetting optical aperture 125B as output light beam 699. The beam steering functionality of FIG. 6A is further illustrated by the light beam 695 which is prevented from substantially being output from the electrowetting optical aperture 125A. In the example, the light beam 695 is output toward electrowetting optical aperture 125A. However, due to the response of the high index of refraction liquid 163 and low index of refraction liquid 165 in electrowetting cell 123A to the voltage/current applied to the respective electrodes 355A and 355B, the light 695 is reflected back into the optical lens 110 and output via the optical lens aperture 135. As a result of the electrowetting signals applied to the respective electrodes 355A-355D, the light output direction of the light emitted by the light source 175 is set. The electrodes 355A and 355D of FIGS. 6A and 6B may be associated with a respective container wall of the electrowetting cell 120, and may be positioned between the hydrophobic surface and insulating layer 88 and the respective container wall.

In addition, light, such as light 695, output by the light source 175 also intersects the transparent wall of the optical lens 110 at higher angles. Light 695 intersects the low index of refraction liquid 165 after exiting the longitudinal neutral surface 113 (i.e., the transparent wall) of the optical lens 110. As a result of the respective positions of the liquids 163 and 165 in the electrowetting cells 123A and 123B, the light produced by the light source 175 is directed, or steered, away from the electrowetting optical aperture 125A and steered toward the electrowetting optical aperture 125B of electrowetting cell 123B and the optical lens aperture 135 for output from the lens assembly 600.

While the example of FIG. 6A shows a beam steering capability of a lighting assembly in one direction, it should be understood that the beam steering capability may be controlled to steer the output beam in other directions around the perimeter of the lighting assembly 600. For example, by application of different voltages to the respective electrodes 355A-D, the positions of liquids 163 and 165 in the electrowetting cells 123A and 123B may change so that the output light beams are steered toward electrowetting optical aperture 125A for output. Based on the received electrowetting signals, other beam steering configurations are also possible.

FIG. 6B is a cross-sectional view of an example of a light detecting device having a variable TIR lens configured to receive an input beam of light from a specific direction in relation to the variable TIR lens. In the variable lens assembly example of FIG. 6B, in contrast to the variable lens assembly example of FIG. 6A, light is input into the optical aperture 135, electrowetting apertures 125A and/or 125B and light is output from the lens interface 130. The example of FIG. 6B when the light assembly 600 is used with a photoreceptive transducer 176 configured as a light detector. When configured as a light detector, the photoreceptive transducer 176 responds to detected light. The lens assembly 600 may be configured to bias the direction from which light is more readily detected by the photoreceptive transducer 176. For example, light 694 enters the light assembly 600 via the electrowetting optical aperture 125A passes through the high index of refraction liquid 163 and intersects with the low index of refraction liquid 165. In response to the intersection with the low index of refraction liquid 165, the light 694 is directed away from optical lens 110 and does not provide meaningful light to the photoreceptive transducer 176. Other light 692 and 693 enters the optical lens 110 through the optical lens aperture 135. Due the angle of entry into the optical lens 110, the light 692 intersects and passes through the neutral surface 113, the light 692 is reflected by the low index of refraction liquid 165 back into optical lens 110 and toward the lens interface 130 and photoreceptive transducer 176. The photoreceptive transducer 176 in response to the detected light generates an electrical signal that is output to the signal interface 180. Conversely, light 693 enters the optical lens 110 at a different place and angle than light 692. Light 693 intersects and passes through the neutral surface 113, the light 693 passes into the high index of refraction liquid 163, where it may reflect multiple times and does not provide meaningful input light to the photoreceptive transducer 176.

The examples of FIGS. 5B and 6B are examples of the variable electrowetting cell configuration in which a field of view of the variable lens assembly is changed from a first field of view, e.g., wide field of view, to a second field of view, e.g., directed field, in response to an electrowetting signal applied via the electrodes coupled to the variable lens assembly.

As shown in the examples of FIGS. 3-6B, the lens assembly 100 is configurable, in response to electrowetting signals applied to one or more of the electrodes, such as 355A-D, to output wider beams of light, or receive light over a wider field of view at the optical lens aperture 135 in response to the high index of refraction liquid 163 extending over a larger area adjacent to the optical lens 110 than the low index of refraction index liquid 165. Both the optical beam shaping and steering settings and the field of view settings are also infinite within the physical constraints of the respective lens assemblies 300-601 and the applied electrowetting signals. In addition, the foregoing examples also illustrate a lens assembly, such as 100 and 300-601, in which the low index of refraction liquid is responsive to electrowetting signals, applied to the electrodes 355A-D from a signal interface. The electrowetting signals cause a variation in the area of the transparent lens exterior wall (i.e., 113) covered by the low index of refraction liquid 165 thereby causing a total internal reflection of light within the transparent, optical lens 110. The variations in the coverage of liquids 163, 165 may be used to vary a direction and/or shape of light output via the electrowetting optical aperture 125 and/or the optical lens aperture 135.

In addition to varying the signals applied to the electrodes of the electrowetting cells to provide different beam shaping and/or beam steering attributes to the output light, the number of electrowetting cells 120 may also be varied. For example, instead of the one or more electrowetting cells described in the examples of FIGS. 1 and 3-6B, the following examples illustrate plan views of variable optical lens assemblies some of which include multiple electrowetting cells. Depending upon the configuration, the following examples may include multiple electrowetting optical apertures, and a plurality of electrodes that manipulate the immiscible liquids with the respective electrowetting cells.

Figure 7A:
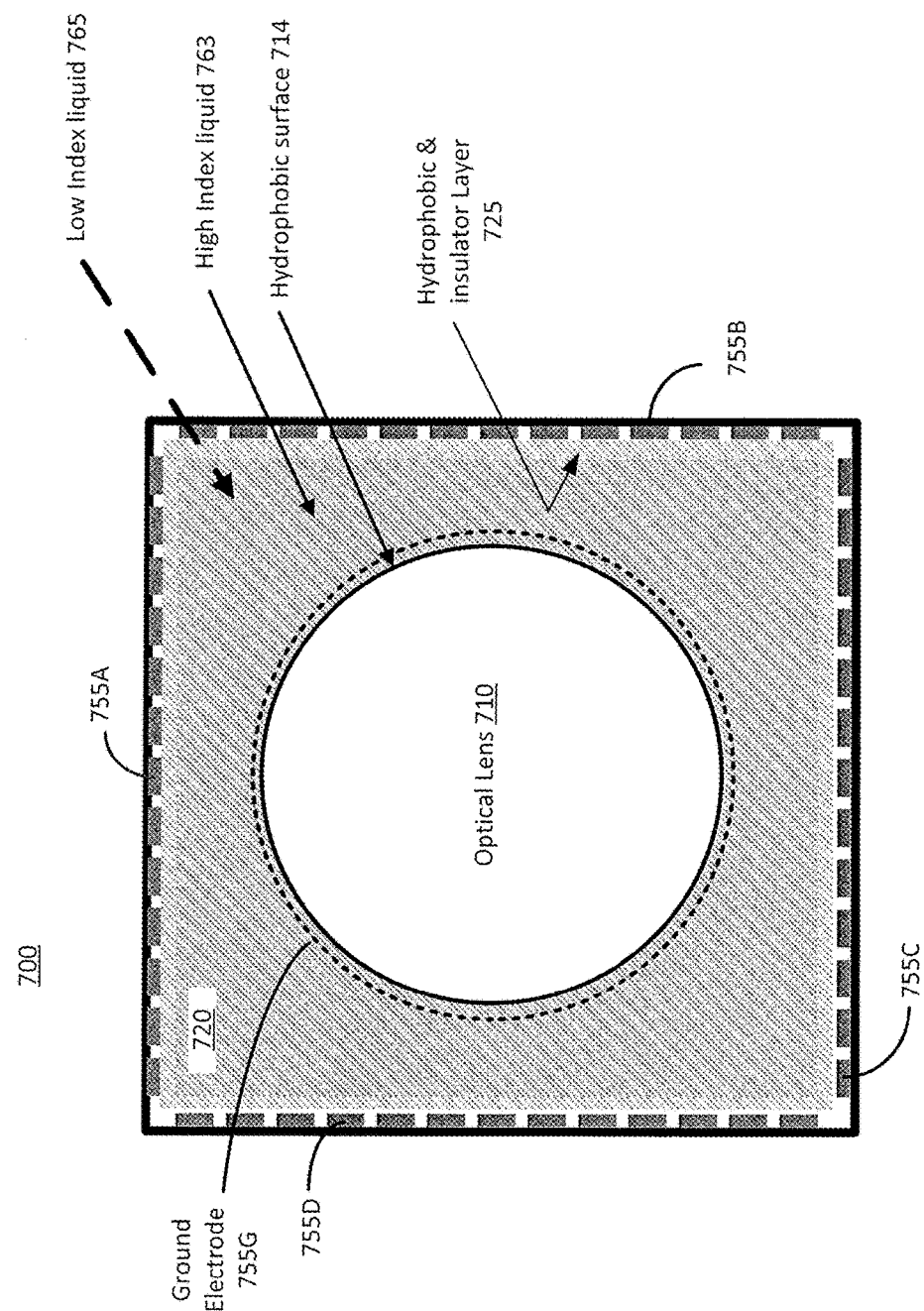
FIG. 7A is a plan view of a variable TIR lens assembly incorporating an example of an electrowetting cell usable in a lighting or detection device.

FIG. 7A is a plan view of a variable optical lens assembly incorporating a first example of an electrowetting lens and a static optical lens. The plan view of the variable optical lens assembly 700 of FIG. 7A is looking into the optical lens aperture of the optical lens 710 and the electrowetting cell 720. For reference, in a light emitting configuration, light output from the lens assembly 700 would be coming out of the page, while in a light detection configuration, light would be input into the page. For example, the optical lens 710 may be parabolic as shown in the examples of FIGS. 1 and 3-6 in which case the ground electrode 755G is located close to the vertex of the parabolic optical lens 710. Of course, other shapes such as cylindrical, oval, polygonal, square and the like are also envisioned. In this example, the electrowetting cell 720 is a single electrowetting cell surrounding the optical lens 710. Since the low index of refraction liquid 765 and the high index of refraction liquid 763 are immiscible, in this view, the high index of refraction liquid 763 is on top of the low index of refraction liquid 765 (shown by the dashed line). The exterior walls of the electrowetting cell 720 includes a hydrophobic and insulator layer 725 that facilitates movement of the liquids 763, 765 within the cell 720 by reducing surface tension and acts as a barrier between electrodes 755A-D and the respective liquids 763 and 765. Similarly, the optical lens 710 has an exterior surface that is a hydrophobic surface 714 that forms an internal surface of the cell 720. The hydrophobic surface 714 also facilitates movement of the liquids 763, 765 within the cell 720. An signal interface, not shown in this example, but such as interface 180 of FIG. 1, is coupled to a controller and to the respective electrodes 755A-755G. The high index of refraction liquid 763 and the low index of refraction liquid 765, in response to signals applied from or through the signal interface between one or more of control electrodes 755A-755D and ground electrode 755G, assume positions within the electrowetting cell 720 that provide an output light beam having a beam shape and beam direction corresponding to the applied signals.

Electrodes 755A-D may be further segmented into multiple, individually controllable electrodes on a same side of the variable optical lens assembly 700. When a desired optical lens assembly configuration is indicated, for example, by a controller, the same or different potentials from the interface 180 may be applied to one or more of the multiple, individually controllable electrodes to achieve the desired optical lens assembly configuration.

Figure 7B:
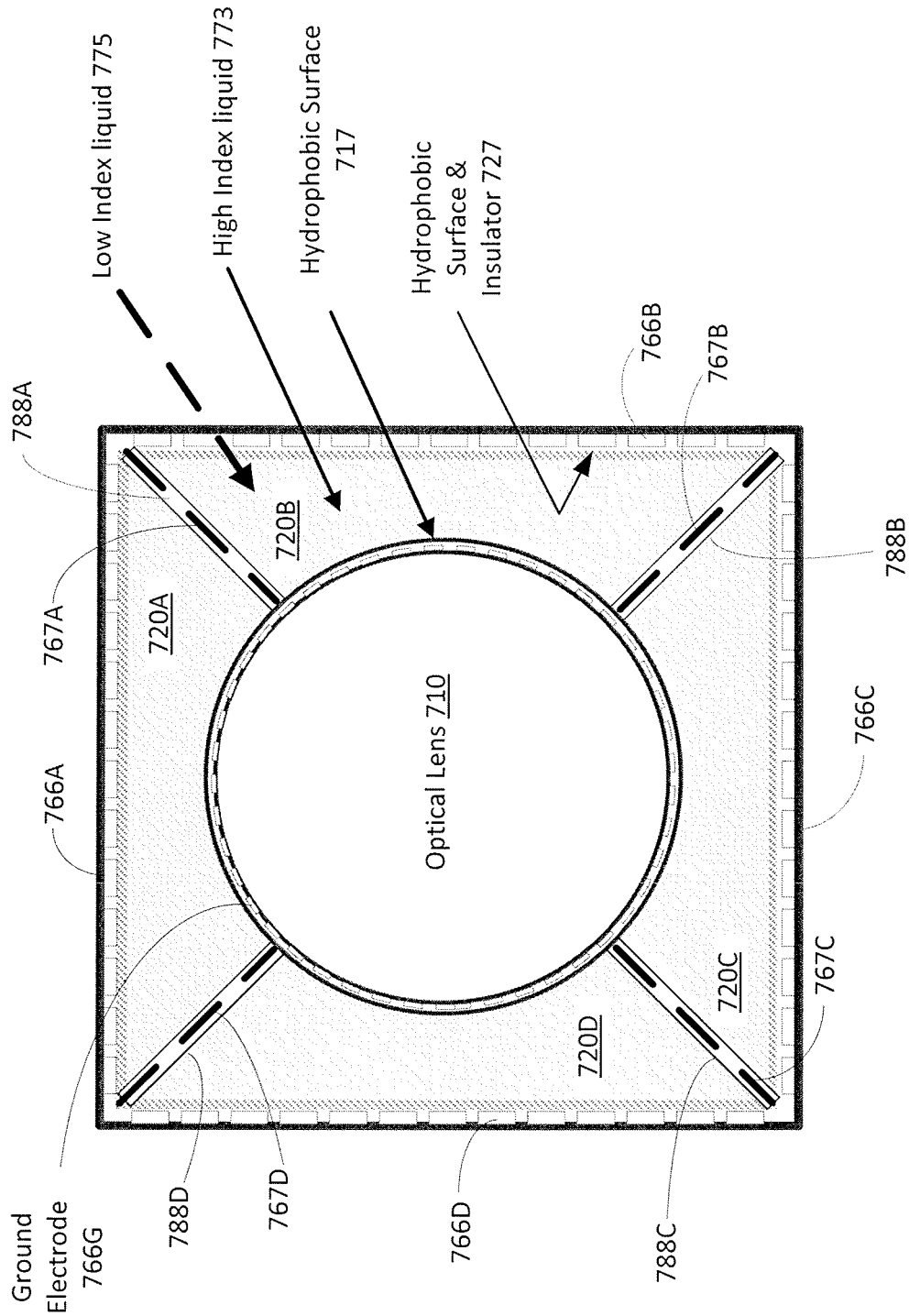
FIG. 7B is a plan view of a variable TIR lens assembly incorporating another example of an electrowetting cell usable in a lighting or detection device.

Other configurations of the lighting device assembly may include more than one electrowetting cells. FIG. 7B is a plan view of a variable optical lens assembly incorporating a another example of an electrowetting lens. The variable optical lens assembly 701 of FIG. 7B includes optical lens 710, four electrowetting cells 720A, 720B, 720C and 720D, control electrodes 766A-766D and ground electrode 766G. In the illustrated example, electrowetting cell 720B includes a low index of refraction liquid 775, a high index of refraction liquid 773, a portion of hydrophobic surface 717 and a hydrophobic surface and insulator 727. In some examples, the hydrophobic surface and insulator 727 may include, or be formed from, a reflective material, such that the surface 727 is reflective. Each of the remaining three electrowetting cells 720A, 720C and 720D include the same elements as electrowetting cell 720B. The electrowetting cells 720A-D are separated from one another by barriers 788A-D. The barriers 788A-D may also serve as walls of the respective electrowetting cells 720A-D bordered by the barriers 788A-D. When serving as walls of the electrowetting cells 720A-D, the barriers 788A-D seal the liquids 775 and 773 within the respective electrowetting cells 720A-D.

In response to electrowetting control signals, such as a voltage or current, applied by or through the signal interface between one or more of control electrodes 766A-766D and ground electrode 766G, the high index of refraction liquid 773 and the low index of refraction liquid 775 assume positions within the electrowetting cell 720. The positions assumed by the liquids 773 and 775 may provide, in some examples, an output light beam having a beam shape and beam direction corresponding to the applied signals. Alternatively, when the lens assembly 700 is used with a light detector, the application of the electrowetting signals facilitates detection of light from a selected direction with reference to the lens assembly 700. The selected direction being based on a field of view configuration determined by the positions assumed high index of refraction liquid 773 and the low index of refraction liquid 775 within the electrowetting cell 720.

In a related example illustrated in FIG. 7B, the barriers 788A-D may be filled with a liquid, such as a low index of refraction liquid that acts to reflect any dispersed light toward the optical output of the respective electrowetting cell 720A-720D. In another alternative, the ground electrode 755G is shown as a single ground electrode. However, each of the respective electrowetting cells 720A-720D may have a separate ground electrode, which may facilitate some form of biasing of either the beam shaping or beam steering functions, as well as field of view settings, of one or more of the respective electrowetting cells 720A-720D.

In an alternative example, the variable optical lens assembly 700 may also include additional electrodes 767A-D along the barriers 788A-D. The additional electrode 767A-D provide an additional level of control of the respective electrowetting cells 720A-D. For example, a signal interface may be configured to deliver signals to the respective electrowetting cells 720A-720D.

In yet another alternative example, while the additional electrodes 767A-D are shown as single electrodes, each of the additional electrodes 767A-D may include multiple electrodes separated in the middle by an insulating layer. The insulating layer prevents the signals applied to the respective electrodes for interfering with one another. This configuration would allow different signals within the barriers 788A-D to be delivered to adjacent electrowetting cells, such as, for example, 720A and 720B, or 720A and 720D.

FIG. 8 is a cross-sectional view of an example of a variable optical lens assembly with a controllable external beam steering device. The variable optical lens assembly 800 includes, in addition to lens assembly elements described in the prior examples, a beam steering optics 880 that are located over the optical outputs 825 and 835 of an optical lens assembly 860 similar to the examples of FIGS. 1 and 3-6.

Specifically, the beam steering optics 880 are positioned over the electrowetting optical outputs, such as 125 of FIGS. 1 and 3-6, and the optical lens output, such as 135 of FIGS. 1 and 3-6. The beam steering optics 880 may include a number of controllable optical elements (not shown) that are configurable to direct light output from the optical lens assembly 860 in various directions. The controllable optical elements that comprise the beam steering optics 880 may include, for example, polarization gratings, liquid crystal polarization gratings, electrowetting cells, liquid crystal diffusing elements, or the like. The beam steering optics 880 are coupled to a signal interface 870, which applies voltage or current signals to the beam steering optics 880 to control the configuration of the optical elements. In response to signals received from the interface 870, the beam steering optics 880 are configured to steer, or redirect, the light into (when transducer 875 is configured to detect light) and out (when transducer 875 is configured to emit light) from the electrowetting optical aperture 825 and/or the optical lens aperture 835. The shape of the beam steering optics 880 may be annular, a rectangular array, a linear array, circular or the like.

The structural elements of the optical lens assembly 860 are similar to the variable lens assemblies shown in the examples of FIGS. 1 and 3-6B, and a detailed discussion of those similar items is omitted in the following discussion of FIG. 8 for the sake of brevity. In addition, although only examples of light output are described, the beam steering optics 880 and optical lens assembly 800 including interface 870 and transducer 875 may also be configurable as a light detector. As a light detector, the optical lens assembly 800 is configured to receive input light via a controllable field of view through the beam steering optics 880 and the optical aperture 835 and/or electrowetting apertures 825. The field of view is determined by the configuration of the beam steering optics 880, the electrowetting cells 820 and the optical characteristics of the optical lens 110.

The signal interface 870 connects to the electrodes, collectively shown as 855, that control the positioning of the liquids 863 and 865. The specific example of FIG. 8 is similar to the example of FIG. 3 as the optical lens assembly 860 is configured by positioning of the liquids 863 and 865 to output a narrow beam of light as beams 898 and 899. For example, the light output by the transducer 875 into the optical lens interface 830 disperses at various angles. Some of the light input to the optical input 830 enters into the optical lens 810 at shallower angles, such as light 891 as well as steeper angles, such as 895. Due to the positions of liquids 863 and 865, as explained with reference to the example of FIG. 3, the beams of light 891 and 895 are reflected into the optical lens 810, and are output from the optical aperture 835 of the optical lens 810. Without any beam steering provided by the beam steering optics 880, the beams of light 895 and 891 would output the optical lens aperture 135 and pass through the beam steering optics 880 in the general direction of beams 892 and 893.

As shown in FIG. 8, the beam steering optics 880 are configured to steer, or redirect, the light beams 892 and 893 in the directions indicated by arrows 898 and 899 in response to optics control signals received from, for example, the signal interface 870. As a result, the light output from the controllable variable lens assembly 800 is more narrowly focused in response to signals received via the signal interface 870 from a controller (not shown in this example). Other examples of external beam shaping and beam steering optics are also envisioned.

Figure 9:
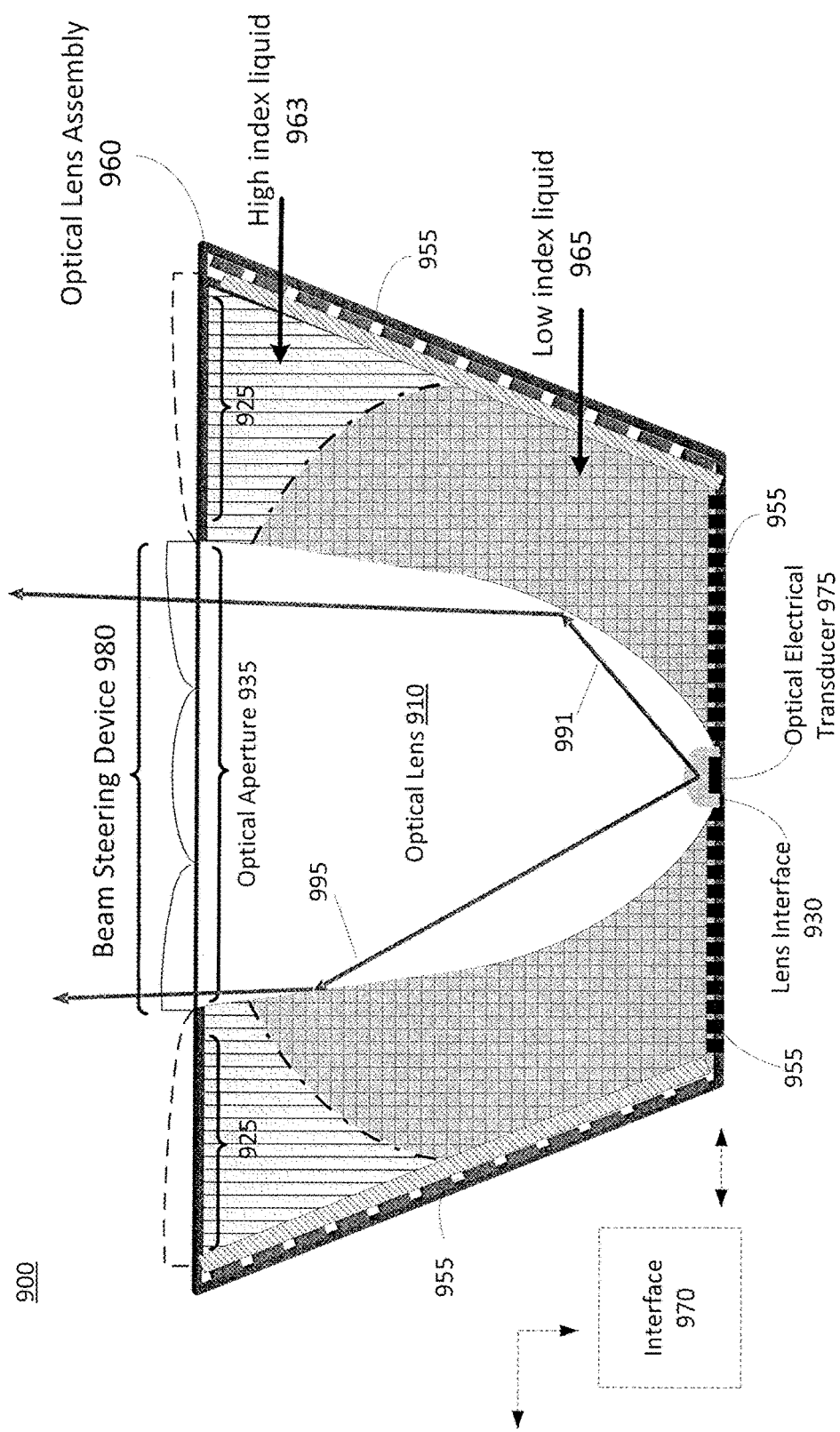
FIG. 9 is a cross-sectional view of an example of a variable TIR lens assembly with a static external beam steering device.

FIG. 9 is a cross-sectional view of an example of a lighting device with a static external beam steering device. The variable optical lens assembly 900 includes a static beam steering device 980 that is located over the optical output of an optical lens assembly 960 similar to the examples of FIGS. 1 and 3-6.

Specifically, the beam steering device 980 is positioned over the optical lens aperture 935, which is similar to the optical lens aperture 135 of FIGS. 1 and 3-6. The beam steering device 980 may include a number of static optical elements such as TIR optics, a surface treatment, electrowetting lenses, a liquid crystal polarization grating (LCPG), a microlens or the like that are configured to further focus light output from optical lens aperture 935 of the optical lens assembly 960. In the illustrated example, the beam steering device 980 is not located over the electrowetting optical apertures 925. In addition, since the beam steering device 980 is a static optical element, it is not coupled to a signal interface 970. The signal interface 970 connects to the electrodes, collectively shown as 955, that control the positioning of the liquids 963 and 965.

The structural elements of the optical lens assembly 960 are similar to the variable lens assemblies shown in the examples of FIGS. 1, 3-6 and 8, and a detailed discussion of those similar items is omitted in the discussion of FIG. 9 for the sake of brevity.

The specific example of FIG. 9 is similar to the example of FIG. 3 as the optical lens assembly 960 is configured by positioning of the liquids 963 and 965 to output a narrow beam of light as beams 995 and 991. For example, the light output by the transducer 975 into the optical input 930 disperses at various angles. Some of the light input to the optical input 930 enters into the optical lens 910 at shallower angles, such as light 991 as well as steeper angles, such as 995. Due to the positions of liquids 963 and 965, as explained with reference to the example of FIG. 3, the beams of light 991 and 995 are reflected into the optical lens 910, and are output from the optical output 935 of the optical lens 910. The beam steering device 980 by further focusing the output light beams 995 and 991 mitigates dispersion of the light output from the variable lens assembly 900. The shape of the beam steering device 980 may be annular, a rectangular array, a linear array, circular or the like.

Figure 10:
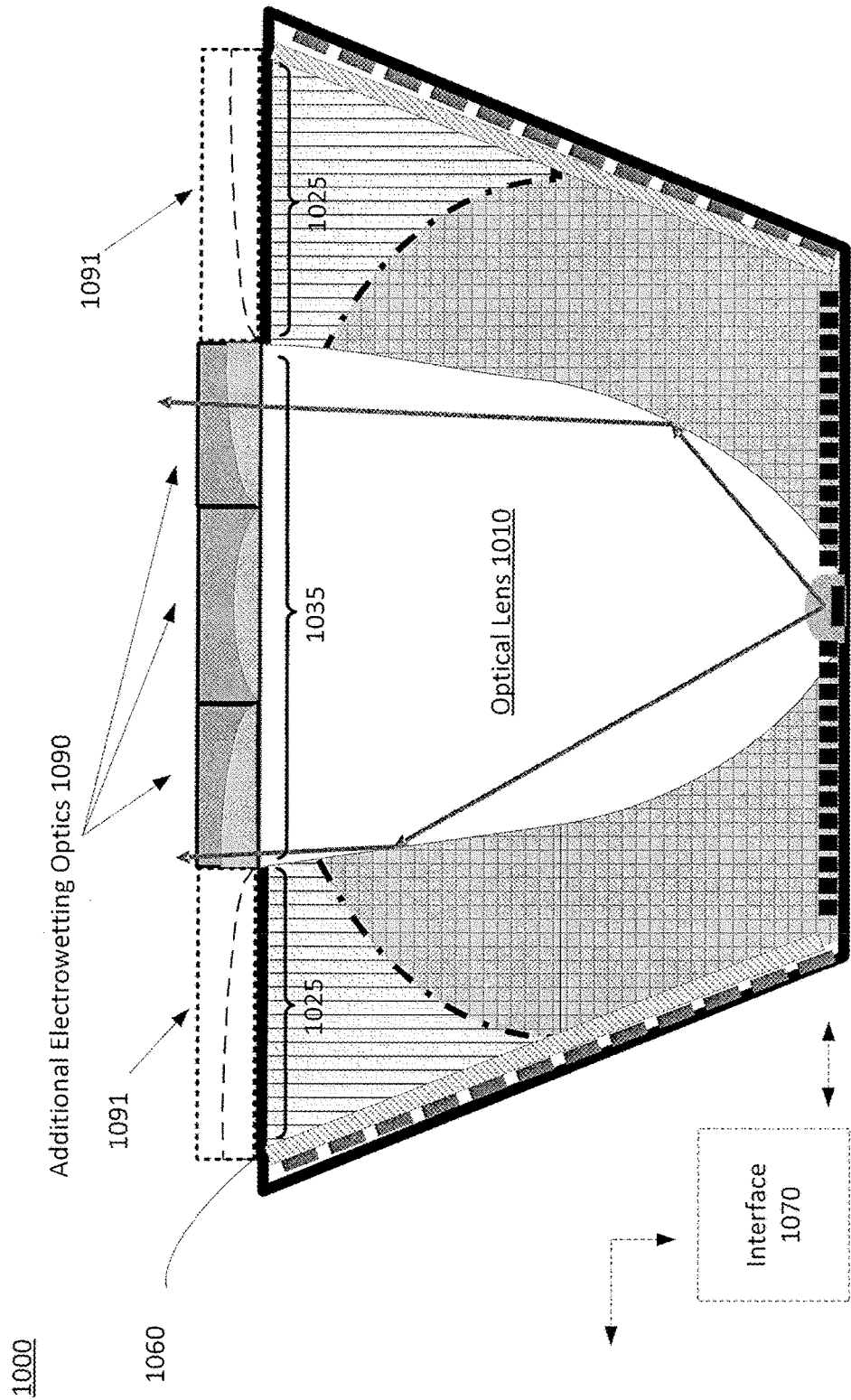
FIG. 10 is a cross-sectional view of an example of a variable TIR lens assembly with additional electrowetting cells to provide additional external beam steering device.

FIG. 10 is a cross-sectional view of an example of a variable optical lens assembly with additional electrowetting cells to provide additional external beam steering device. The variable optical lens assembly 1000 includes a lens assembly 1060 and additional electrowetting optics 1090. The lens assembly 1060 in the example of FIG. 10 is substantially similar to the lens assemblies 860 and 960 shown in the examples of FIGS. 8 and 9, and therefore, any detailed discussion of the lens assembly 1060 is omitted.

The additional electrowetting optics 1090 are positioned over the optical lens aperture 1035, similar to static beam steering device 980 of FIG. 9. The additional electrowetting optics 1090 and the lens assembly 1060 are coupled to a signal interface 1070 in a similar manner as explained in previous examples. The additional electrowetting optics 1090 respond to voltage or current signals received from the signal interface 1070 to provide additional beam steering or beam shaping to light that is output from the optical lens 1010. Alternatively or optionally, additional optics 1091 may be positioned over the electrowetting optical apertures 1025 to provide additional beam shaping or beam directing functionality. While the lens elements 1181, 1082, 1088 and 1091 are referred to as static, it is also envisioned that the lens elements may be controllable lens elements such as polarization gratings, liquid crystal gratings and/or electrowetting cells.

Figure 11:
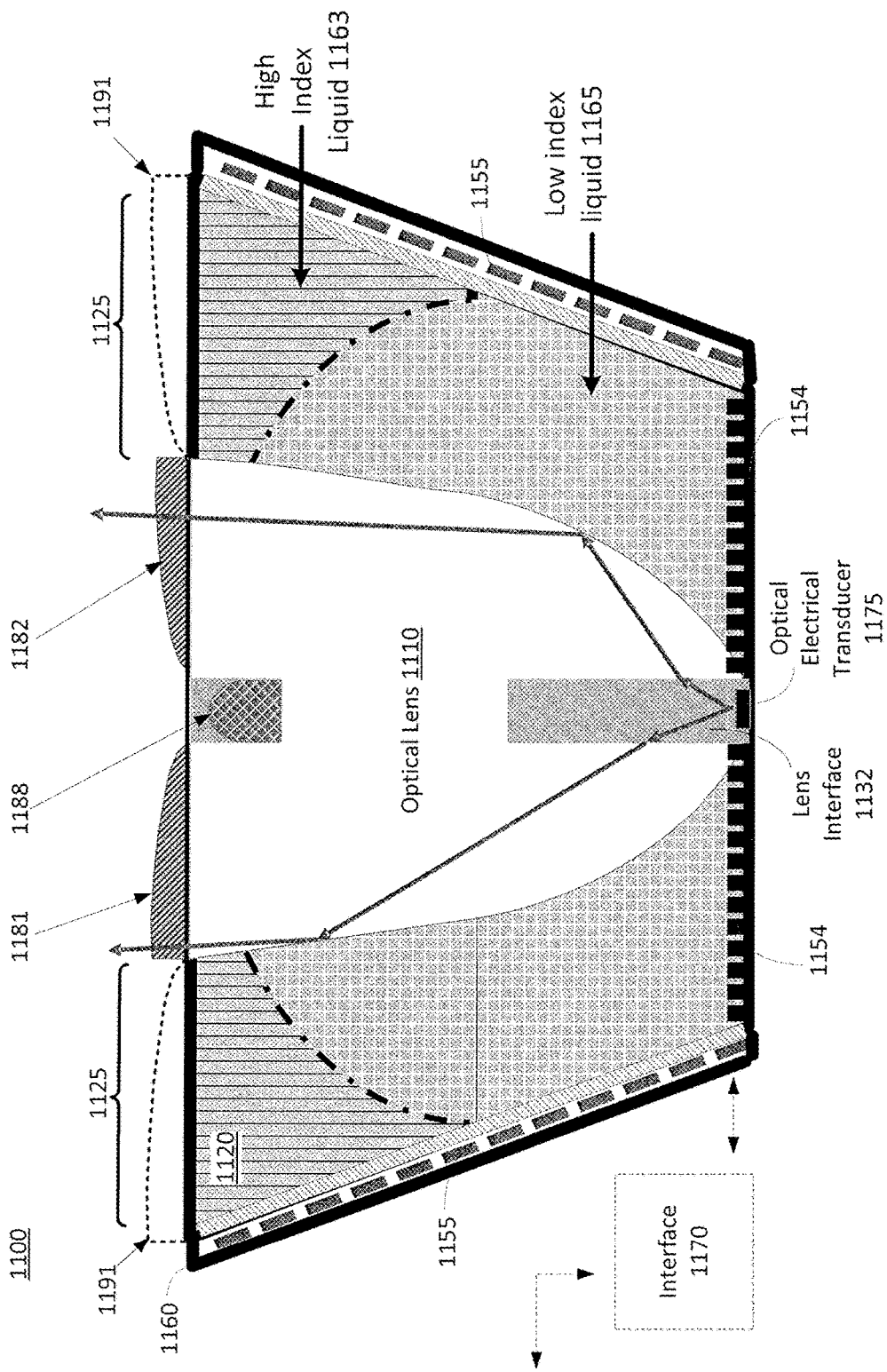
FIG. 11 is a cross-sectional view of an example of a variable TIR lens assembly with an alternate configuration of a variable lens assembly incorporating electrowetting cells.

FIG. 11 is cross-sectional view of an example of a variable optical lens assembly with an alternate configuration of a variable lens assembly incorporating electrowetting cells. Similar to the static external beam steering device example of FIG. 9, the example of FIG. 11 includes static lens elements 1181, 1182 and 1188. In the example, the variable optical lens assembly 1100 includes the optical lens assembly 1160 and the static lens elements 1181, 1182 and 1188. Similar to the static external beam steering device example of FIG. 9, the example of FIG. 11 includes static lens elements 1181, 1182 and 1188. The optical lens assembly 1160 includes an optical lens 1110 surrounded by and electrowetting cell 1120. The electrowetting cell 1120 is a fluidic leakproof, sealed container that contains a high index of refraction liquid 1163 and low index of refraction 1165. Electrodes 1155 are positioned on walls of the electrowetting cell 1120. Light may be output from the electrowetting cell 1120 via transparent, electrowetting optical apertures 1125. The electrowetting optical apertures 1125 are positioned about an optical aperture of the optical lens 1110. Alternatively or in addition, optional static lens elements 1191 may be positioned over the electrowetting optical apertures 1125 to provide additional beam shaping or beam directing functionality. While the lens elements 1181, 1182, 1188 and 1191 are referred to as static, it is also envisioned that the lens elements may be controllable lens elements such as polarization gratings, liquid crystal gratings and/or electrowetting cells.

The functional features of the electrowetting cell 1120 may be similar to the electrowetting cells, such as 120 described with reference to FIGS. 1 and 3-6.

The optical lens 1110 is made of similar materials as optical lens 110 described with reference to FIGS. 1 and 3-6. However, the optical lens 1110 includes a lens interface 1132 that extends within the optical lens 1110 and focuses the light emitted by transducer 1175 toward the optical lens output and the additional lens device 1188. The additional lens 1188 may be configured to focus light received from the lens interface 1132 and other areas of the optical lens 1110 for output from the optical lens 110. The additional lens 1181 and 1182 may be total internal reflection (TIR) lens elements. The additional lens 1181 and 1182 may be different sides of an annular lens positioned over optical lens 1110. Alternatively, lens 1181 and 1182 may be individual arrays that extend across the optical lens 1110. The lens 1181 and 1182, whether collectively or individually, may be a polarization grating, a microlens or the like.

Figure 12:
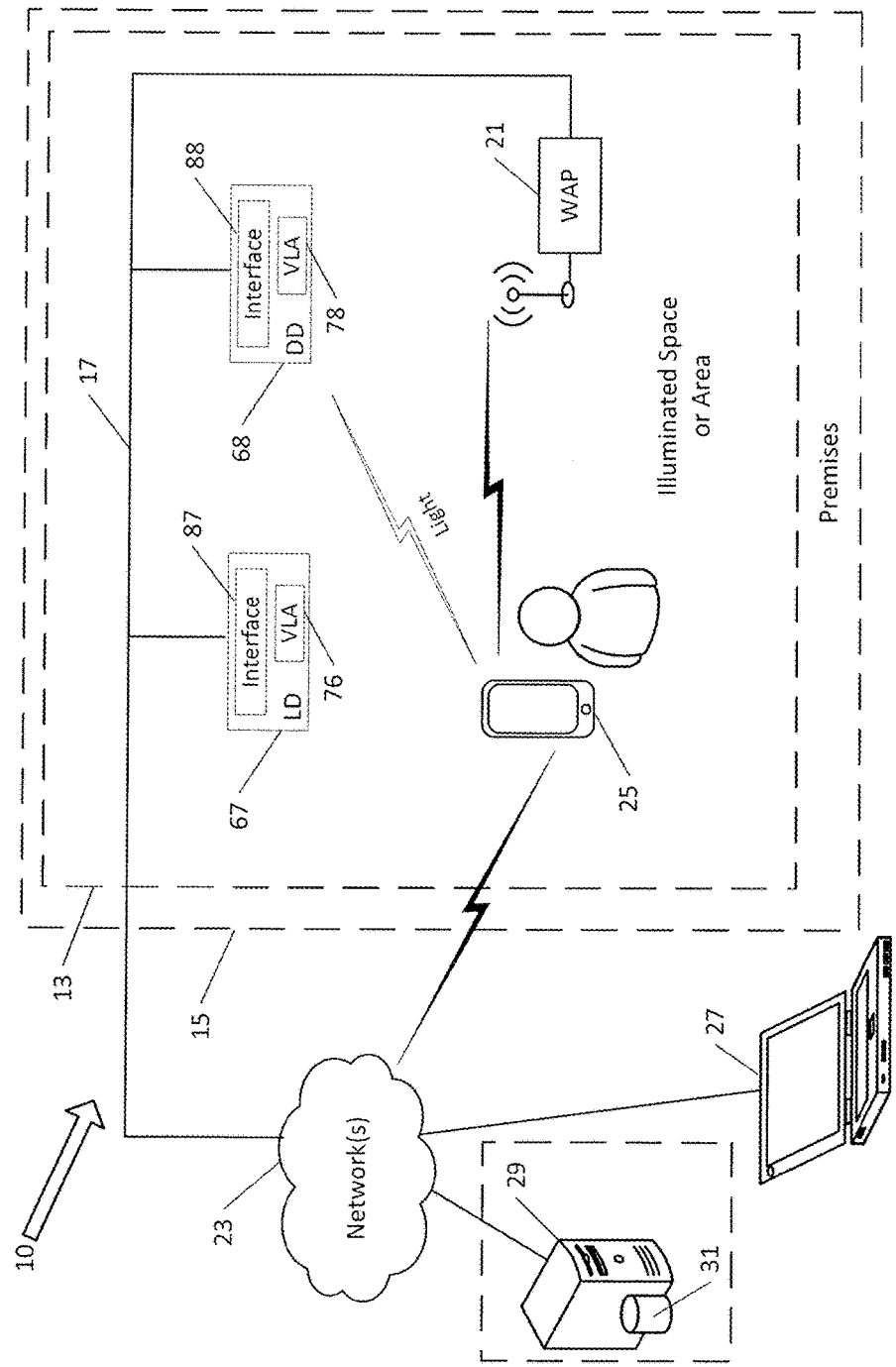
FIG. 12 is a simplified system diagram of a system having lighting devices and detection devices incorporating variable TIR lens assemblies, such as those illustrated in any of FIGS. 1 and 3-11.

FIG. 12 is a simplified system diagram of a lighting system having lighting devices incorporating variable optical lens assemblies, such as those illustrated in any of FIGS. 1 and 3-11. FIG. 12 shows a premises 15 having an illuminated space or area 13 in which a lighting device 67 incorporates a variable lens assembly (VLA) 76. The lighting device 67 may include a VLA 76 and a signal interface 87 as described in any of the examples of FIGS. 1 and 3-11. The signal interface 87 (described in more detail with reference to the example of FIGS. 13A and 13B) may receive control signals that are applied directly to the variable lens assembly 76 of the lighting devices 67. Alternatively, any control signals received by the signal interface 87 may be converted to signals that are then applied to the variable lens assembly 76.

Also shown is a detector device (DD) 68 in which the VLA 78 is configured for use as a light detecting device. The optical/electrical transducer in the VLA 78 is configured as a light detecting device that outputs, or causes the output of, a signal in response to detected light, for example, a visible light communication code as emitted by the mobile device 25 in the illuminated space or area 13, or ambient light in the illuminated space or area 13. The interface 88 (described in more detail with reference to the example of FIGS. 13A and 13B) may receive light detection signals from the VLA 78 that are either processed by the interface 88 or are passed to a server, such as server 29.

The data network 17 in the example also includes a wireless access point (WAP) 21 to support communications of wireless equipment at the premises 15. For example, the WAP 21 and network 17 may enable a user terminal, such as mobile device 25 for a user to control operations, such as the beam shaping and beam steering as described with reference to FIGS. 3-11 of any lighting device 67 or detector device 68 at the premises 15. However, the ability to control operations of a lighting device 67 or detector device 68 may not be limited to a user terminal accessing data network 17 via WAP 21 or other on-premises access to the network 17. Alternatively, or in addition, a user terminal such as laptop 27 located outside premises 15, for example, may provide control signals to one or more lighting devices 11 via one or more other networks 23 and the on-premises network 17. Network(s) 23 includes, for example, a local area network (LAN), a metropolitan area network (MAN), a wide area network (WAN) or some other private or public network, such as the Internet. Alternatively or in addition, a server, such as server 29, coupled to a database, such as database 31, may control the variable optical assemblies 76 by sending control signals to the signal interface 87 of the respective lighting devices 67 or interface 88 of detector device 68. In addition, different control signals may be sent to different lighting devices 67 within the same illuminated space or area 13 to provide customized lighting effects, such as task lighting, that are provided by lighting devices 67 cooperating to provide the desired lighting effect. Alternatively or in addition, different control signals may be sent to different detection devices 68 within the same illuminated space or area 13 to provide customized responses to detected lights, such as controlling a co-located lighting device 67, controlling a building function, such as turning on air conditioning or some other function, or the like. The devices 25, 27 and 29 may act as external controllers that are coupled to the respective signal interface 87 of the LD 67 and/or signal interface 88 of the DD 68.

The examples of FIGS. 1 and 3-12 refer to a signal interface, such as 180 and 87. Examples of interfaces are shown in the functional block diagram examples of FIGS. 13A and 13B.

Figure 13A:
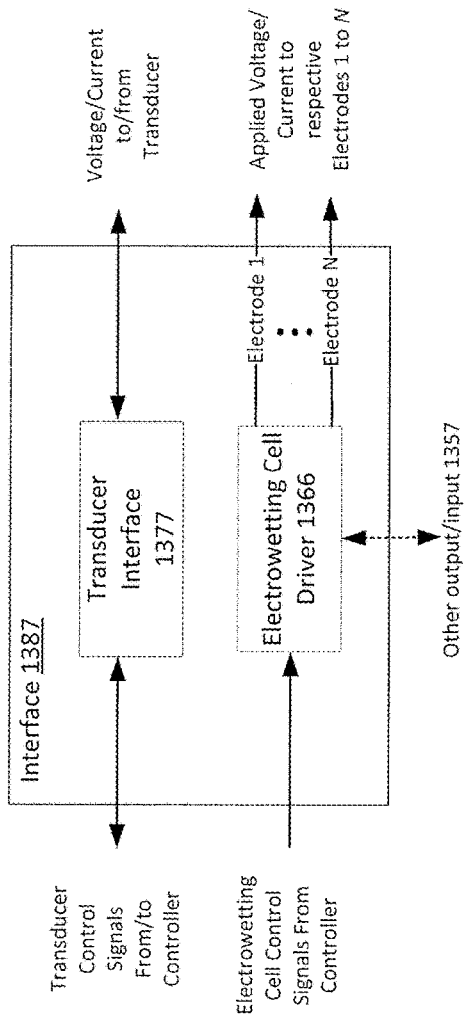
FIGS. 13A and 13B illustrate functional block diagram examples of a signal interface for use in devices incorporating variable TIR lens assemblies, such as those illustrated in any of FIGS. 1 and 3-12.

In FIG. 13A, the signal interface 1387 may be integrated in a lighting device, a light detection device, or a device having both lighting and detection functions, such as an emergency lighting device, that also incorporates a variable TIR lens assembly, such as those illustrated in any of FIGS. 1 and 3-12. The signal interface 1387 includes a transducer interface 1377 and an electrowetting cell driver 1366. The signal interface 1387 also has inputs to receive transducer control signals and electrowetting control signals from a controller, such as 25, 27, or 29 of FIG. 12. The transducer interface 1377 may receive the transducer control signals from the controller and convert the received control signals into a voltage or current that is applied to a transducer configured as a light source, such as an LED or other light source. The transducer interface 1377 may include electronic circuit components both analog and digital circuitry as well as logic circuits that receive and process the received control signals for output as voltages or currents applied to the light source-configured transducer.

Alternatively, when the transducer is configured as a light detector, the transducer interface 1377 is configured to receive signals from the transducer indicative of a characteristic of the detected light, such as brightness, intensity, phase, wavelength (e.g., infrared, near-infrared, color or the like). In such a configuration, the transducer interface 1377 may receive signals from the transducer, such as 175, and process the received signals into signals for transmission to a controller, such as 25, 27 or 29 of FIG. 12.

Regardless of whether the transducer is configured for light emission or light detection, the signal processing may include digital-to-analog conversion, signal buffering, signal conditioning or other signal manipulation that facilitates an output from the transducer that corresponds to, depending upon the transducer interface configuration, either the received control signal or the received transducer signal. Alternatively, the transducer control signals received from the controller may be passed without processing by the transducer interface 1377 directly to the transducer as the applied voltage or current. Similarly, the transducer interface 1377 may pass the signals received from the transducer to another device, such as a controller or gateway device, without any processing.

The electrowetting cell driver 1366 includes an input for receiving the electrowetting control signals delivered to the signal interface 1377 and a number of outputs to respective electrodes 1 to N of the electrowetting cell of a lens assembly, as shown in the examples of FIGS. 3-11. The electrowetting cell driver 1366 may receive the electrowetting cell control signals from the controller and convert the received control signals into a voltage or current that is applied to electrodes 1-N of the electrowetting cell, such as 120 of FIG. 1, to place the electrowetting cell in a state that provides the desired optical characteristics for the lens assembly. The electrowetting cell driver 1366 may include electronic circuit components both analog and digital circuitry as well as logic circuits, including a multiplexor that receive and process the output signals as applied voltages or currents to the respective electrodes. The processing may include digital-to-analog conversion, signal buffering, signal conditioning or other signal manipulation that facilitates an output from the transducer that corresponds to the received control signal.

Alternatively, in examples when the interface 1387 is configured to operate with a detection device, the electrowetting cell may be placed in a state that provides in combination with the TIR lens optics, the optical characteristics that correspond to the desired light detection attributes, such as receiving light within a narrow field of view, a wide field of view or a field of view between the narrowest and the widest fields of view.

Figure 13B:
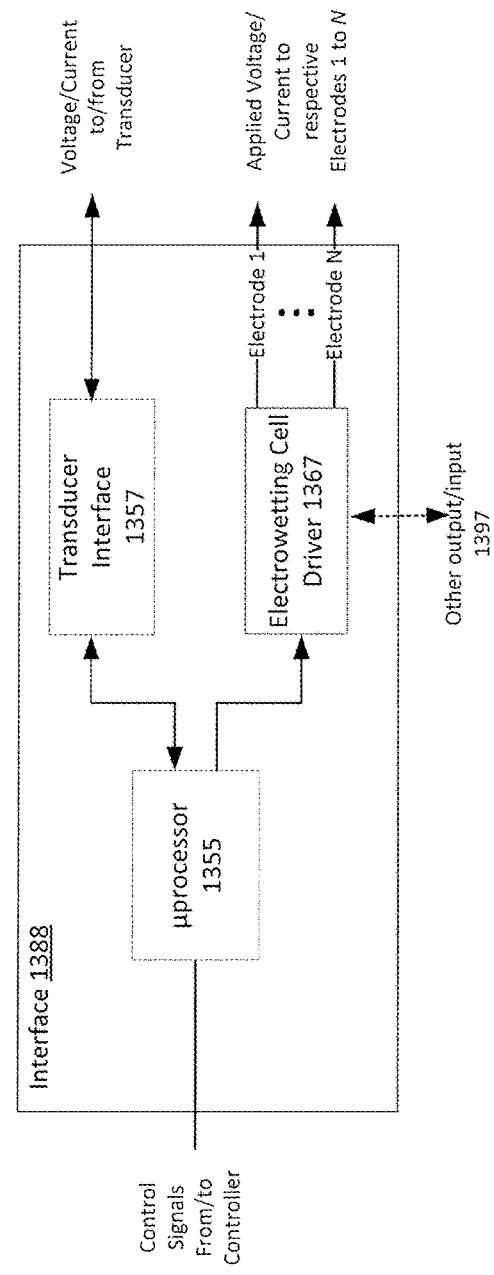

FIG. 13B illustrates another example of a signal interface, such as 180 in FIG. 1. The signal interface 1388 of FIG. 13B may be integrated in devices incorporating variable TIR lens assemblies for emitting light and/or for detecting light, such as those illustrated in any of FIGS. 1 and 3-12. The interface 1388, in this example, includes a microprocessor 1355, a transducer interface 1357, and an electrowetting cell driver 1367. The microprocessor 1355 may receive control signals from a controller, such as 25, 27, or 29 of FIG. 12. The microprocessor 1355 may determine that the received control signals are intended for either the transducer or an electrode. For example, the received control signal may include a signal value that the microprocessor 1355 is able to identify, and based on the identification is able to appropriately process the signal. Based on the determination or the identification, the microprocessor 1355 may pass a light control signal to the transducer interface 1357, which is processed by the transducer interface 1357 in a manner similar to that described above with reference to transducer interface 1377 of FIG. 13A, and is applied to a transducer, such as 175, to cause the emission of light by the transducer 175. If the microprocessor 1355 determines that the received control signals are intended for the electrowetting cell, such as 120 of FIG. 1, the microprocessor 1355 may further determine which of the 1 to N electrodes a voltage or current is to be applied.

Alternatively, in the example of a detection device in which a transducer, such as 175 in FIG. 1, is configured to respond to detected light, the microprocessor 1355 may receive signals from the transducer in response to the detection of light by the transducer. In addition, the microprocessor 1355 may receive control signals from a controller, such as devices 25, 27 and/or 29 of FIG. 12 indicating desired configurations of a lens assembly, such as receive light within a narrow field of view, a wide field of view or a field of view between the narrowest and widest fields of view within the capabilities of the lens assembly. Based on the received control signals, the microprocessor 1355 may generate electrowetting cell control signals that place the electrowetting cell in a state that provides the field of view or other optical characteristics corresponding to a desired light detection attribute.

Either of the signal interfaces 1387 or 1388 shown in FIG. 13A or 13B, respectively, may also be configured to generate respective control signals that are output, via, for example, the respective other output 1357 or 1397 to a reservoir management system (not shown), such as a pumping mechanism, that either intakes excess fluid from the electrowetting cell(s) or outputs additional fluid into the electrowetting cell(s) to provide an even greater range of optical characteristics.

Although shown in each of the examples in FIGS. 13A and 13B, the respective electrowetting cell drivers 1366 and 1377 may be a number of dedicated drivers that drive individual electrodes 1 to N. So instead of a single electrowetting cell driver, the respective interfaces 1387 and 1388 include 1 to N electrowetting cell drivers.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A detection device, comprising:
a photoreceptive transducer configured to detect light and generate signals in response to the detected light;
a signal interface coupled to the transducer to receive the generated signals from the transducer and configured to output detection signals based on the received generated signals; and
a lens of a transparent material having a first index of refraction, the transparent lens comprising:
an optical lens aperture, opposite a lens interface, configured to receive light from field of view for direction through the transparent lens toward the transducer,
a lens interface to provide light to the transducer, and
a transparent exterior lens wall extending from the lens interface to the optical lens aperture; and
a controllable electrowetting assembly surrounding the transparent lens, the controllable electrowetting assembly being coupled to the signal interface and configured to respond to electrowetting signals received from the signal interface, the controllable electrowetting assembly comprising:
sealed container walls including at least one wall spaced about the transparent lens, wherein the sealed container walls form a fluidic sealed cell with the exterior wall of the transparent lens,
a high index of refraction liquid and a low index of refraction liquid contained in the sealed cell, one of the liquids being conductive and the other of the liquids being an insulator,
an electrowetting optical aperture through one or more of the container walls and extending outward from the optical lens aperture, and
electrodes coupled to the signal interface and electrically coupled with at least the low index of refraction liquid, wherein:
the low index of refraction liquid is responsive to the electrowetting signals output from the signal interface, to vary an amount of the exterior wall of the transparent lens covered by the low index of refraction liquid and cause total internal reflection of light within the transparent lens to thereby vary a direction and/or shape of light received from the field of view via the electrowetting optical aperture and/or the optical lens aperture.

2. The detection device of claim 1, wherein:
an index of refraction of the high index of refraction liquid is higher than the first index of refraction of the transparent lens, and
an index of refraction of the low index of refraction liquid is lower than the first index of refraction of the transparent lens.

3. The detection device of claim 1, wherein the photoreceptive transducer is a photo-detector, a light detecting diode, a photoconductive cell, a photo-emissive cell or a photo-voltaic cell.

4. The detection device of claim 1, wherein the transparent material of the transparent lens is a glass or plastic having the first index of refraction.

5. The detection device of claim 1, wherein the electrodes of the controllable electrowetting assembly extend at predetermined positions along a length of the sealed container walls in a direction from the lens interface to the optical lens aperture.

6. The detection device of claim 1, wherein:
a narrow field of view through the optical lens aperture is provided in response to the low index of refraction liquid extending over a larger amount of the transparent lens wall than the high index of refraction index liquid.

7. The detection device of claim 1, wherein:
a wide field of view through the optical lens aperture and the electrowetting optical aperture is provided in response to the high index of refraction liquid extending over a larger amount of the transparent lens wall than the low index of refraction index liquid.

8. A device, comprising:
a transducer that converts optical energy into an electrical signal; and
a variable lens assembly, coupled to deliver light to the transducer, comprising:
(a) a structurally static lens formed of a transparent material having a first index of refraction in a fixed shape, including:
a lens interface at a proximal end of the shape to provide light to the transducer;
an optical aperture at a distal end of the shape opposite the proximal end to receive light from an environment in which the device is located; and
an exterior wall that extends from a portion of the lens interface to a portion of the optical aperture; and
(b) a controllable electrowetting cell coupled to the exterior wall of the transparent lens, comprising:
a container wall spaced from the exterior wall of the transparent lens, the container wall and the exterior wall of the transparent lens forming a fluidic leakproof container;
an electrode associated with the container wall to receive a control signal;
a high index of refraction liquid within the container; and
an electrically conductive low index of refraction liquid within the container, wherein:
the high index of refraction liquid and the low index of refraction liquid are immiscible, and
in response to a change of the control signal, the high index of refraction liquid and the low index of refraction liquid change positions within the electrowetting cell thereby altering internal light reflection characteristics of the exterior wall of the transparent lens.

9. The device of claim 8, wherein the lens assembly has predetermined optical characteristics based on a configuration of the transparent lens, positions of the high index of refraction liquid and the low index of refraction liquid within the electrowetting cell and a configuration of the transducer.

10. The device of claim 8, wherein an extent of change in positions of the high index and low index of refraction liquids relative to one another is based upon a value of the control signal applied to the electrode.

11. The device of claim 8, wherein:
the high index of refraction liquid has a first volume;
the low index of refraction liquid has a second volume; and
the ratio of the volume of the high index of refraction liquid to the volume of the low index of refraction liquid contributes to the alteration of the internal light reflection characteristics of the exterior wall of the transparent lens when a control signal is received.

12. The device of claim 8, further configured to:
receive light from a narrower field of view through the optical lens aperture in response to the low index of refraction liquid extending over a larger area of the exterior wall of the transparent lens than an area of the exterior wall of the transparent lens covered by the high index of refraction liquid.

13. The device of claim 12, further comprising:
a coupling to a signal interface,
wherein the transducer is further configured to:
in response to the received light, output via the coupling a signal to the signal interface.

14. The device of claim 8, wherein:
the electrowetting cell further comprises:
an electrowetting optical aperture that receives light from the environment and that is substantially coplanar with the optical aperture of the transparent lens; and
the device is further configured to:
receive light from a wider field of view through the optical lens aperture and the electrowetting optical aperture of the electrowetting cell in response to the high index of refraction liquid extending over a larger area of the exterior wall of the transparent lens than an area of the exterior wall of the transparent lens covered by the low index of refraction index liquid.

15. The device of claim 14, further comprising:
a coupling to a signal interface,
wherein the transducer is further configured to:
in response to the received light, output via the coupling a signal to the signal interface.

16. A variable optical detection device, comprising:
a light detector that converts detected light into an electrical signal;
a variable lens assembly that directs input light toward the light detector, the variable lens assembly including:
a static, transparent total internal reflection lens, the lens having a first field of view; and
a variable electrowetting cell, including:
a container forming a fluidically sealed space about the transparent lens;
a high index of refraction liquid and a low index of refraction liquid contained in the sealed space of the cell, one of the liquids being conductive and the other of the liquids being an insulator, and
electrodes coupled to the variable lens assembly and at least electrically coupled with at least the low index of refraction liquid;
wherein the variable electrowetting cell is configured to:
change a first field of view of the lens assembly device to a second field of view, in response to an electrowetting signal applied via the electrodes.

17. The variable optical detection device of claim 16, further comprising:
a signal interface coupled to the transducer and to the electrodes, wherein the signal interface is configured to:
receive electrical signals from the transducer; and
deliver electrowetting signals to the electrodes to control the field of view of the lens assembly.

18. The variable optical detection device of claim 17, wherein the low index of refraction liquid is responsive to the electrowetting signals output from the signal interface, to vary the amount of the exterior wall of the transparent lens covered by the low index of refraction liquid to thereby vary the field of view through the variable lens assembly.

19. The variable optical detection device of claim 17, wherein the transducer is further configured to:
in response to the detected light, output a detection signal to the signal interface.

20. The variable optical detection device of claim 16, wherein the light detector is one of a photo-detector, a photoreceptive device, a light detecting diode, a photoconductive cell, a photo-emissive cell, or a photo-voltaic cell.

* * * * *